(12) United States Patent
Rzepkowski et al.

(10) Patent No.: US 6,850,259 B1
(45) Date of Patent: Feb. 1, 2005

(54) SYSTEMS AND METHODS FOR PROVIDING ORIGINAL DOCUMENT ORIENTATION, TONE REPRODUCTION CURVES AND TASK SPECIFIC USER INSTRUCTIONS BASED ON DISPLAYED PORTIONS OF A GRAPHICAL USER INTERFACE

(75) Inventors: Kristinn R. Rzepkowski, Rochester, NY (US); Rudolph A. Rodrigues, Rochester, NY (US); Glenn A. Emerson, Brockport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,266

(22) Filed: Jan. 19, 2000

(51) Int. Cl.[7] .............................. G06F 3/00; G06F 3/14; H04N 1/40
(52) U.S. Cl. ....................... 345/835; 345/705; 345/715; 345/771; 345/833; 345/846; 345/689; 345/773; 345/786; 358/442; 715/527
(58) Field of Search ................................. 345/705, 708, 345/709, 714, 715, 771, 810, 689, 764, 773, 784, 786, 787, 833, 835, 838–840, 846; 358/1.15, 400, 401, 442, 443, 448, 451, 453, 468; 361/681; 399/81, 182; 715/517, 521, 523, 526, 527

(56) References Cited

U.S. PATENT DOCUMENTS

| | | | | |
|---|---|---|---|---|
| 5,157,768 A | * | 10/1992 | Hoeber et al. | 345/711 |
| 5,301,036 A | * | 4/1994 | Barrett et al. | 358/448 |
| 5,581,684 A | * | 12/1996 | Dudzik et al. | 345/708 |
| 5,659,790 A | * | 8/1997 | Kim et al. | 715/500.1 |
| 5,715,415 A | * | 2/1998 | Dazey et al. | 345/708 |
| 5,727,174 A | * | 3/1998 | Aparicio et al. | 345/837 |
| 5,751,285 A | * | 5/1998 | Kashiwagi et al. | 345/833 |
| 5,825,356 A | * | 10/1998 | Habib et al. | 345/712 |
| 5,828,374 A | * | 10/1998 | Coleman et al. | 345/786 |
| 6,222,538 B1 | * | 4/2001 | Anderson | 345/709 |
| 6,222,539 B1 | * | 4/2001 | Watts | 345/708 |
| 6,373,507 B1 | * | 4/2002 | Camara et al. | 345/825 |
| 6,396,518 B1 | * | 5/2002 | Dow et al. | 345/772 |
| 6,452,607 B1 | * | 9/2002 | Livingston | 345/705 |
| 6,456,303 B1 | * | 9/2002 | Walden et al. | 345/705 |
| 6,466,302 B1 | * | 10/2002 | Rousseau et al. | 355/61 |
| 6,542,163 B2 | * | 4/2003 | Gorbet et al. | 345/711 |

OTHER PUBLICATIONS

"Visioneer One Touch 8600 Scanner", Jun. 1999, Visioneer, pp. 24–45.*

* cited by examiner

*Primary Examiner*—X. L. Bautista
(74) *Attorney, Agent, or Firm*—Oliff & Berridge, PLC

(57) ABSTRACT

Features, such as finely controlling toner response curves and properly orienting documents, provided by imaging capturing devices are accessed through a complicated graphical user interface that includes a number of tabs and large number of dropdown boxes, pop-up boxes, drop-down menus, and the like. Various displayable portions of a scanner control graphical user interface include a task-specific user instruction access button. Selecting the task-specific user instruction access button causes a pop-up menu to be displayed listing tasks that can be accomplished using, at least in part, various ones of the control elements displayed in the currently displayed portion of the scanner control graphical user interface. Upon selecting a selectable task item in the pop-up menu, a task-specific user instruction graphical user interface is displayed. A task instruction portion of the task-specific user instruction graphical user interface, provides the user with detailed instructions for accomplishing the selected task. A related tasks portion provides the user with a list of selectable tasks related to the selected task. The task description in the task instruction portion includes selectable terms used in the task description. Selecting a selectable term allows the user to either access the help entries on the selected term and/or causes a new list of selectable tasks to be displayed in the related tasks portion.

20 Claims, 22 Drawing Sheets

SYSTEMS AND METHODS FOR PROVIDING ORIGINAL DOCUMENT ORIENTATION, TONE REPRODUCTION CURVES AND TASK SPECIFIC USER INSTRUCTIONS BASED ON DISPLAYED PORTIONS OF A GRAPHICAL USER INTERFACE

BACKGROUND OF THE INVENTION

1. Field of Invention

This invention is directed to a graphical user interface for an image capture device, such as a scanner.

2. Description of Related Art

Scanners and other types of image capture devices have become ubiquitous office productivity tools for generating electronic images of physical original documents. Once an electronic image of a physical original document has been generated, the electronic image data can be used in an infinite variety of ways to increase the productivity and the product quality of an office. Such image capture devices include desktop scanners, other stand-alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data.

However, as the cost of scanners and other image capture devices has dropped and the output quality of the captured electronic image data has improved, scanners and other image capture devices have been provided with an ever-increasing number of controllable features. Similarly, as users have become comfortable with capturing and using electronic image data obtained from original documents, the uses to which the electronic image data has been put, and thus the needed control over the quality and appearance of the electronic image data, have expanded greatly.

In response, standard interfaces between such image capture devices, including those indicated above, and the various application programs that use such captured electronic image data have been developed. These standard interfaces allow standard-compliant image capture devices and standard-compliant applications to easily communicate. One exemplary embodiment of such a standard interface is the TWAIN™ interface. The TWAIN™ interface allows any TWAIN™-compliant application program to input and use electronic image data using any TWAIN™-compliant image capture device.

SUMMARY OF THE INVENTION

The TWAIN™-compliant component protocol facilitates communication between application programs and image capture devices, such as those indicated above. One such TWAIN™ image capture device is the XEROX® Digi-Path™ scanner.

The ever-increasing numbers of features provided by image capturing devices, such as the Xerox® DigiPath™ scanner, cause users of these image capturing devices to find it increasingly difficult to obtain the desired scanning results.

In particular, the various features provided by imaging capturing devices, such as the Xerox® FireStar™ are accessible through a complicated graphical user interface that includes a number of tabs and large number of dropdown boxes, pop-up boxes, dropdown menus, and the like. Accordingly, even sophisticated users can have trouble remembering how to accomplish specific tasks that can be accomplished by appropriate interacting with the graphical user interface. While this graphical user interface includes a Help function, the Help function is often inadequate to easily guide the user in accomplishing a desired task. As a result, users often forego performing desired tasks.

This invention provide systems, methods and graphical user interface control elements that allow the user to access task-specific instructions for various tasks.

This invention separately provides systems, methods and graphical user interfaces that display a list of tasks that are specific to the particular graphical user interface control elements currently displayed to the user.

This invention separately provides systems, methods and graphical user interfaces that provide a task-specific user instruction graphical user interface accessible through a task-specific user instruction access button, where the task-specific user instruction graphical user interface provides a detailed description of the steps needed to perform a selected task.

This invention additionally provides systems, methods and graphical user interfaces that provide, in the task-specific user instruction graphical user interface, a list of selectable related tasks.

This invention further provides systems, methods and graphical user interfaces that provide in the task-specific user instruction graphical user interface, selectable elements that link terms and phrases in the task description to either or both of conventional help information or lists of tasks related to the selected selectable element.

In various exemplary embodiments of this invention, various displayable portions of the scanner control graphical user interface include a task-specific user instruction access button. Selecting the task-specific user instruction access button causes a pop-up menu to be displayed listing tasks that can be accomplished using, at least in part, various ones of the control elements displayed in the currently displayed portion of the scanner control graphical user interface. Upon selecting one of the selectable task items in the pop-up menu, a task-specific user instruction graphical user interface is displayed. In a task instruction portion of the task-specific user instruction graphical user interface, the user is provided with a detailed set of instructions for accomplishing the selected task. In a related tasks portion, the user is provided with a list of selectable elements that identify tasks related to the selected task.

Additionally, the task description in the task instruction portion may include one or more selectable terms used in the task description. Selecting a selectable term allows the user to either access the help entries on the selected term and/or causes a new list of selectable tasks to be displayed in the related tasks portion. These new tasks are tasks related to the selected term.

In addition to providing the above task specific user instructions, there is a need for other features to obtain desired scanning results.

In particular, one such feature provided by image forming devices and image capturing devices is the ability to finely control various image quality response curves. One such response curve is the tone reproduction curve (TRC). In particular, in some image forming devices and image capture devices, it is possible to finely control the tone reproduction curve beyond merely providing the conventional lower-resolution indication that the entire output image should be lighter or darker than the entire input image.

Accordingly, to enable this fine control, the user is often provided with a graphical user interface that allows the user to define a number of points to which a response curve is to be fit. Once the various points are defined, a response curve is fit to or through these points. However, even sophisticated users have trouble intuitively appreciating the effects of this adjusted response curve in converting the input image values to the output image values. Thus, it is often different for even sophisticated users to use the graphical user interface shown in FIG. 5 to obtain the desired output image.

This invention thus provides systems, methods and graphical user interfaces that allow the user to finely control a response curve of an image quality for an image forming or capture device in a more intuitive manner.

This invention separately provides substrate, methods and graphical user interfaces that provide a plurality of slider portions that allow the user to more intuitively control the image quality response curve.

This invention separately provides systems and methods and graphical user interfaces that include slider portions that mimic control elements of conventional control panels.

This invention separately provides systems, methods and graphical user interfaces that provide control elements for controlling portions of an image quality response curve that each closely mimic the conventional lightness/darkness controls of a photocopier.

In various exemplary embodiments of the systems, methods and graphical user interfaces according to this invention, an image quality response curve control graphical user interface includes a plurality of slider portions. Each slider corresponds to a point, or a range of points, of the image quality response curve. The slider portions are arranged so that the points, or range of points, associated with each slider portion are themselves arranged in an easily understandable order. Each slider portion indicates, for the associated point, or range of points, of the input image the image value of the output image for that point, or for that range of points.

In various exemplary embodiments, the appearance of a portion of each of the slider portions is altered based on the selected image value of the output image for the point, or the range of points, of the input image. Thus, the user can intuitively appreciate the effects of adjustments made to the image quality response curve, such as a tone reproduction curve.

In addition to providing the above task specific user instructions and tone reproduction curves, there is a need for other features to obtain desired scanning results.

For example, original documents are often provided to an image capture device in such a way that the resulting captured images, when provided to an imaging application, are upside down, rotated 90°, or cut off. These incorrect orientations occur because the original documents were incorrectly loaded into the image capture device. Typically, image capture devices, such as the exemplary production scanner 100 shown in FIG. 1, have markings on the document handler 130 that indicate how the original documents are to be put into the scanner. Unfortunately, these markings are often, if not usually, ignored when the original documents are loaded into the document handler 130 in favor of a desired orientation of the user. As can be imagined, this is particularly troublesome when a large number of original documents are placed into an automatic document handler in the wrong orientation, such that a large number of essentially unusable image capture operations are performed.

This invention thus provides systems, methods and graphical user interfaces that allow the user to select the orientation of an image capture operation of an original document.

This invention separately provides systems, methods and graphical user interfaces that indicate to an operator the orientation an original document should have when fed into the image capture device to obtain a captured image having the desired orientation In various exemplary embodiments of the systems, methods and graphical user interfaces of this invention, a document orientation portion, or input document mimic, of the graphical user interfaces provides a visual indication to the user of the orientation of the original documents to be captured that will result in the desired orientation of the captured image being obtained. In particular, based on various selected image capture parameters input by the user, the systems, methods and graphical user interfaces of this invention determine and display one or more visual cues to the user that indicate the orientation of the original document that will allow the image capture device to capture an image of the original document that corresponds to the image capture parameters selected by the user. In various other exemplary embodiments of the systems, methods and graphical user interfaces of this invention, an image orientation portion of the graphical user interfaces allows the user to specify the orientation of the original document to be used when capturing an image of the original documents. In response, the systems, methods and graphical user interfaces of this invention aid the user in selecting the proper other image capture These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
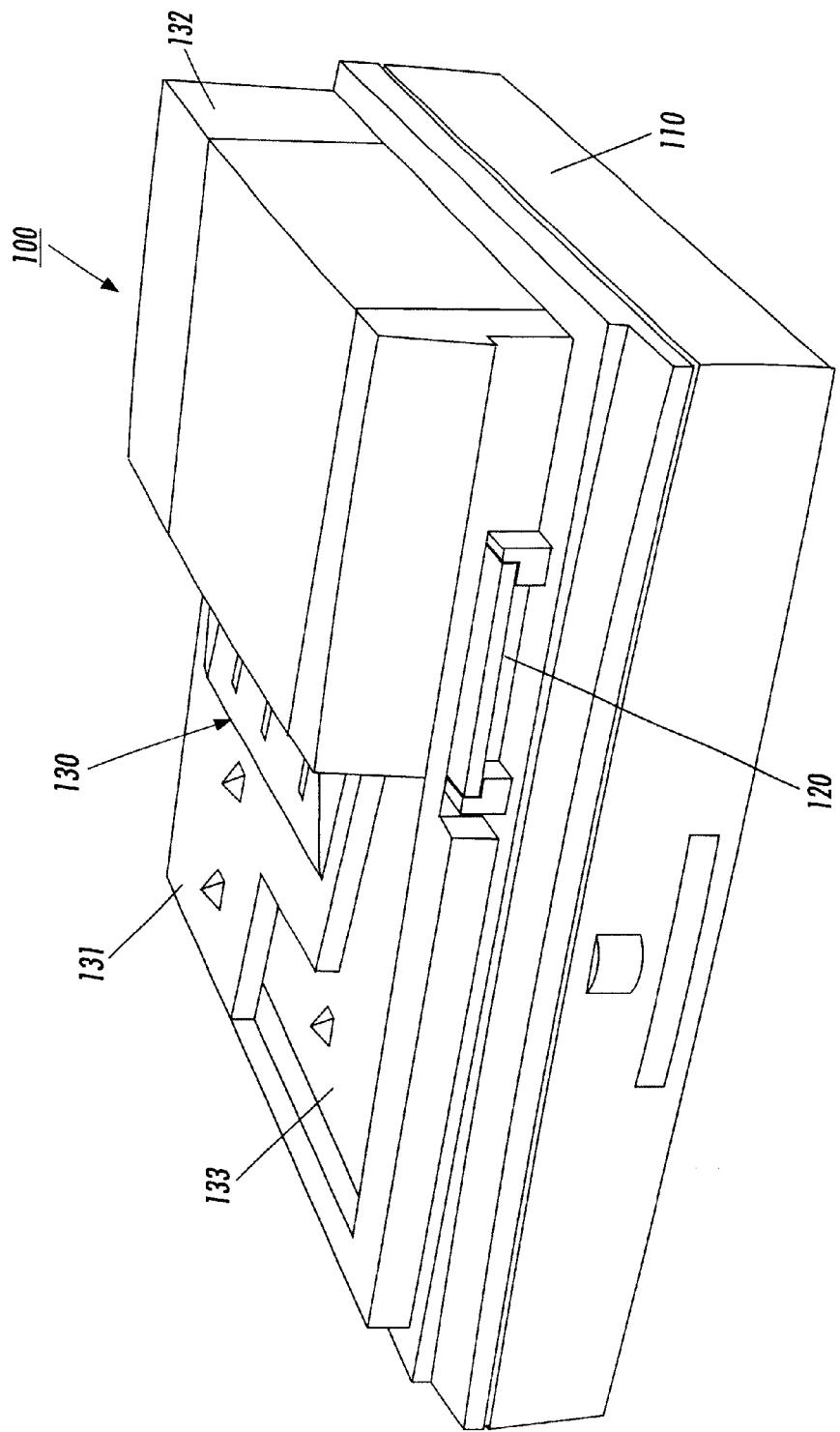
FIG. 1 is a perspective drawing of an exemplary electronic image generating device.

FIG. 1 illustrates a first exemplary embodiment of an electronic image data capturing device 100 usable with the image previewing systems, methods and graphical user interfaces of this invention. As shown in FIG. 1, the electronic image data capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document.

It should be appreciated that the electronic image data capture device can also be referred to as variously, a scanner, an image capture device, an electronic image data generating device, or the like, and, regardless of the name, can be any one of a stand-alone scanner, a digital copier, a facsimile machine, a multi-function device, a digital still camera, a digital video camera, an electronic image database storing previously generated electronic image data, or any other known or later device that is capable of generating (or supplying) electronic image data from an original document.

Figure 2:
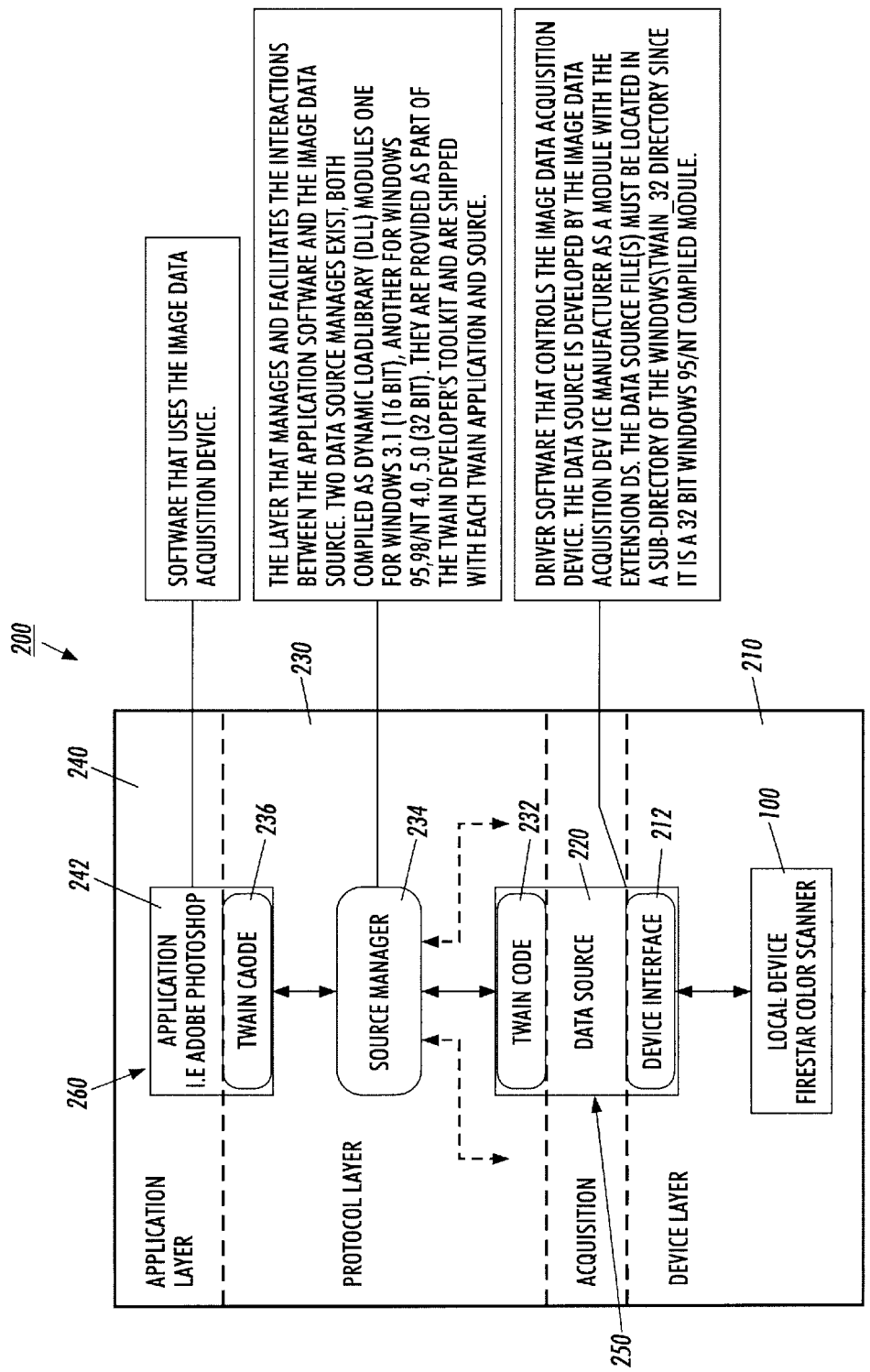
FIG. 2 is a block diagram illustrating a first exemplary embodiment of the structure of an image capture device control system that incorporates the various exemplary embodiments of the image previewing systems, methods and graphical user interfaces of this invention.

FIG. 2 is a block diagram illustrating a first exemplary embodiment of the structural organization of an image capture device control system 200 that incorporates the image previewing systems, methods and graphical user interfaces according to this invention. As shown in FIG. 2, the image capture device control system 200 includes a device layer 210, an acquisition layer 220, a protocol layer 230, and an application layer 240. In particular, the device layer 210 includes the image capture device 100, such as a Xerox® DigiPath™ color scanner or any of the other electronic image data capture devices indicated above. The device layer 210 also includes a device interface portion 212 of a TWAIN™ driver, or TWAIN™ data source, 250. In particular, as shown in FIG. 2, the TWAIN™ driver (or data source) 250 bridges the device layer 210, the acquisition layer 220 and the protocol layer 230.

The protocol layer 230 includes a TWAIN™ code portion 232 of the TWAIN™ driver (or data source) 250, a source manager 234 and a TWAN™ code portion 236 of a TWAIN™-compliant application 260. The application layer 240 includes the application portion 242 of the application 260.

As shown in FIG. 2, control and data signals are provided from the electronic image data capture device 100 to the TWAIN™ driver (or data source) 250 through the device interface portion 212 of the TWAIN™ driver (or data source) 250. Similarly, control and data signals between the TWAIN™ driver (or data source) 250 and the source manager through the TWAIN™ code portion 232 of the TWAIN™ driver (or data source) 250. The control and/or data signals are also provided between the source manager 234 and the application 260 through the TWAIN™ code portion 236. In various exemplary embodiments, the TWAIN™ driver (or data source) 250 controls the electronic image data capture device 100. In various ones of these exemplary embodiments, the TWAIN™ driver or data source 250 is developed by the manufacturer of the electronic image data capture device 100.

The source manager 234 manages and facilitates the interactions between the application 260 and the TWAIN™ driver or data source 250. In various exemplary embodiments, one or more of two distinct source managers 234 have been implemented. Both are compiled as dynamic loading library modules. One exemplary dynamic load library implementation of the source manager 234 is a 16-bit program developed for, for example, Microsoft® Windows® 3.1. The other dynamic load library implementation of the source manager 234 is a 32-bit program developed for Windows® 95/98 and Windows® NT 4.0/5.0. In general, these two dynamic load library modules are provided as part of the TWAIN™ developers tool kit and are shipped with each TWAIN™-compliant application and at each TWAIN™-compliant electronic image data generating device.

Figure 3:
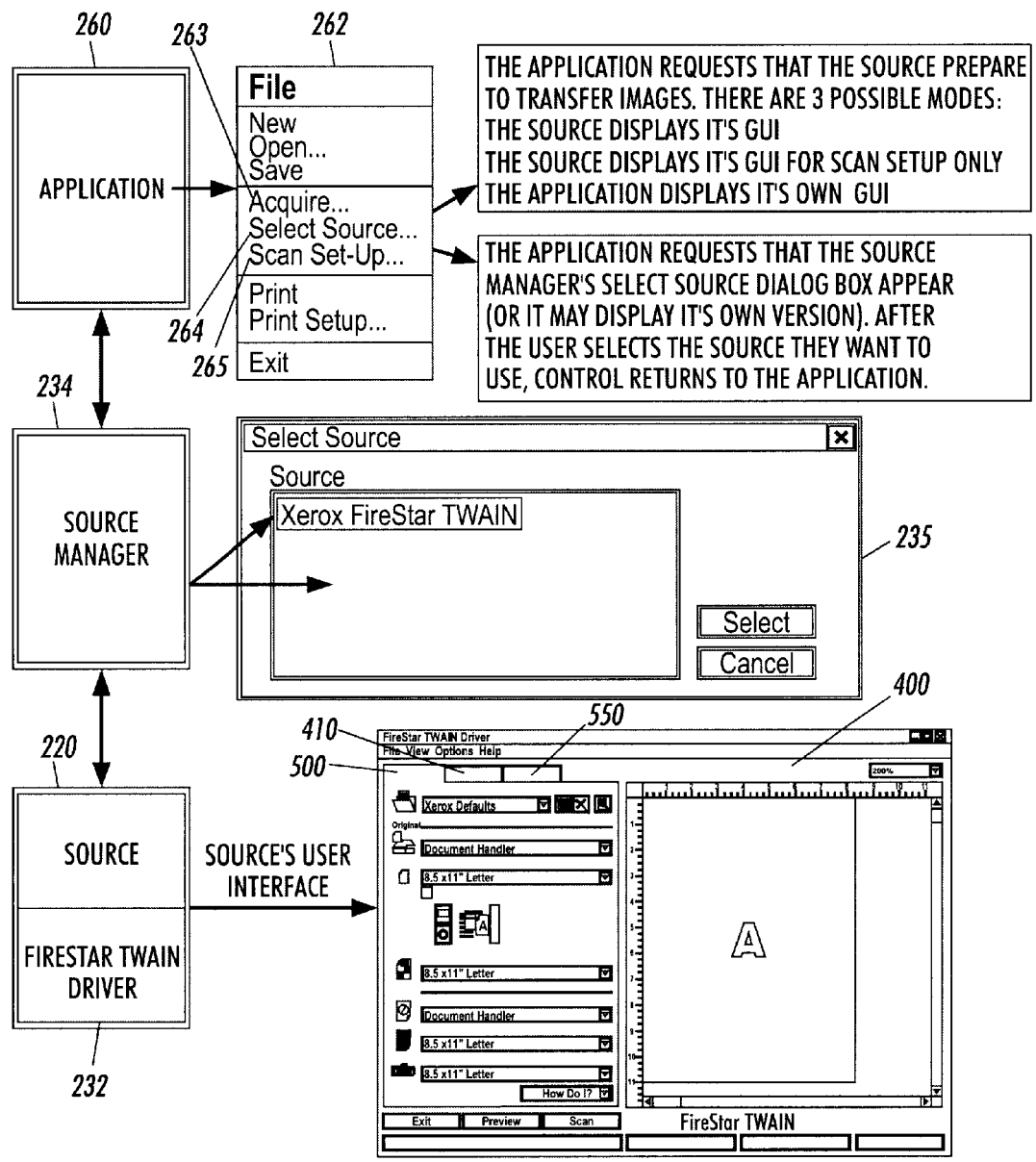
FIG. 3 is a second exemplary embodiment of an image capture and usage system that incorporates the systems and methods of this invention.

FIG. 3 illustrates one exemplary embodiment for accessing the systems, methods and graphical user interfaces according to this invention. As shown in FIG. 3, a FILE menu 262 of a TWAIN™ compliant application 260 will include a plurality of menu items that provide an interface to a TWAIN™ compliant electronic image data capture device 100, such as a TWAIN™-compliant scanner. These menu items include various ones of at least an Acquire menu item 263, a Select Source menu item 264 or a Scan Set-Up menu item 265.

As shown in FIG. 3, selecting the Acquire menu item 263 causes the application 260 to request that the electronic image data capture device 100 prepare to capture electronic image data from an original document and/or transfer capture electronic image data to the image capture device control system. In particular, in response to the selecting the Acquire menu item 263, the application 260 can display its own graphical user interface. Alternatively, the TWAIN™ driver (or data source) 250 for the selected electronic image data capture device can display one of its graphical user interfaces. Finally, if the Scan Set up menu item 265 was selected, the TWAIN™ driver (or data source) 250 can display a specific Scanner Set-Up graphical user interface.

In particular, as shown in FIG. 3, when any of the menu items 263–265 are selected, the application 260 calls the source manager 234. In response, the source manager accesses each TWAIN™ driver (or data source) 250 that is present in the image capture device control system 200. The source manager 234 then displays, in a graphical user interface 235, all of the different TWAIN™ drivers (or data sources) 250 present on the image capture device control system 200. Once the user selects the particular TWAIN™ driver (or data source) 250 that the user wishes to use, the TWAIN™ driver (or data source) 250 will display a graphical user interface 400 that allows the user to select various ones of the image capture parameters and scanning control functions implemented in that TWAIN™ driver (or data source) 250.

Figure 4:
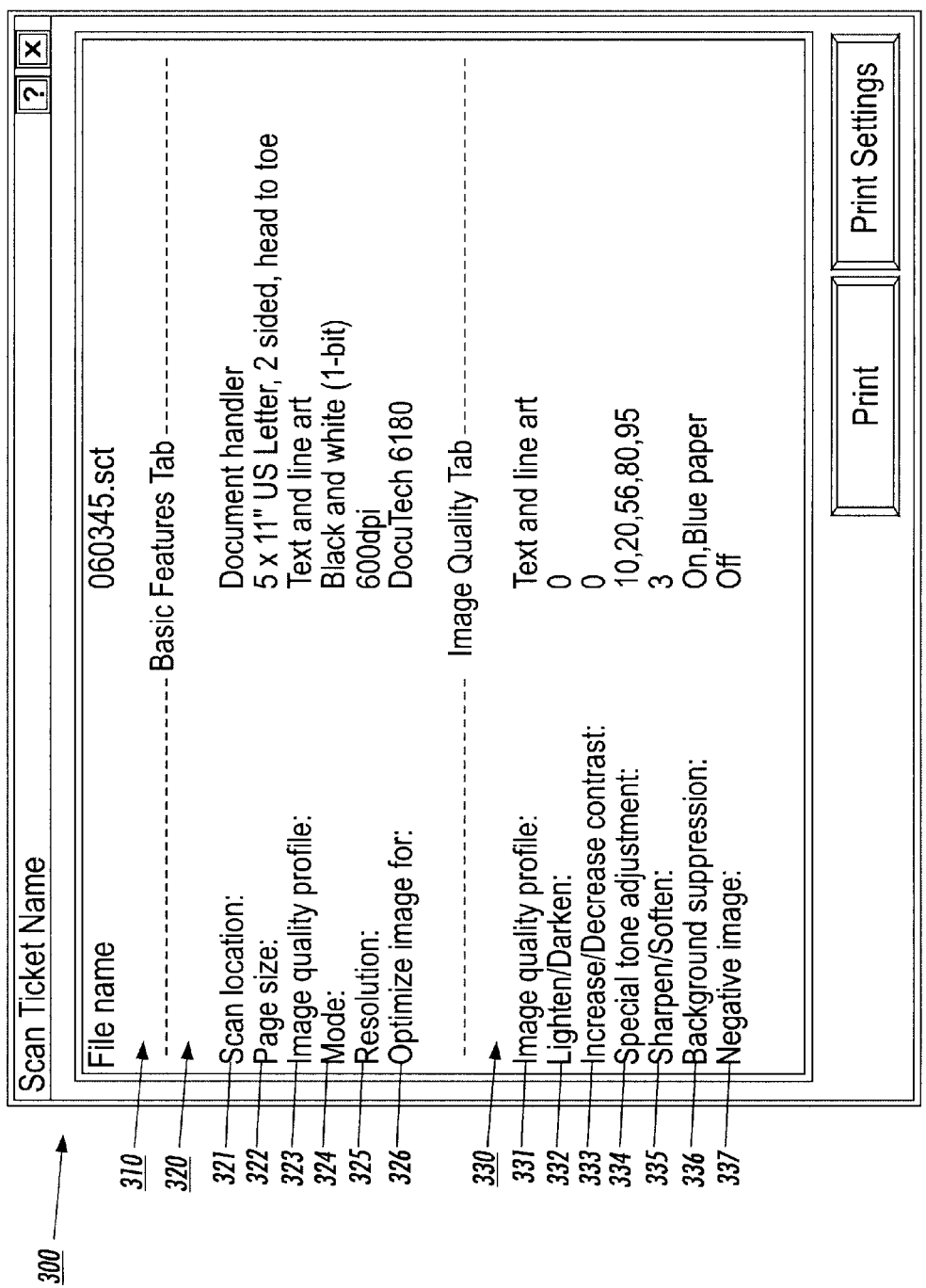
FIG. 4 is an exemplary embodiment of a scan ticket illustrating various image scanning parameters according to this invention.

FIG. 4 illustrates one exemplary embodiment of a scan ticket 300. Scan tickets contain all of the settings in the TWAIN™ graphical user interface 400, which is discussed in greater detail below. In general, there will be a set of one or more sets of saved scan parameters, or "scan tickets" for each language supported the TWAIN™ driver (or data source) 250 according to this invention. When the TWAIN™ graphical user interface 400 is displayed, only those sets of saved scan parameters, or "scan tickets" for the language the user is currently operating in are displayed. When a set of saved scan parameters, i.e., a "scan ticket", is selected, all the settings contained within that scan ticket are used to populate the TWAIN™ graphical user interface 400 according to this invention.

As shown in FIG. 4, a scan ticket 300 includes at least a file name portion 310, a basic features portion 320, an image quality portion 330 and an image size portion (not shown). The basic features portion 320 corresponds to the basic features tab 500 of the TWAIN™ graphical user interface 400 shown in FIG. 3. Similarly, the image quality portion 330 and the image size portion correspond to the image quality tab 410 and the image size tab 560, respectively, of the graphical user interface 400 shown in FIG. 3. The image quality tab 410 is described in greater detail in U.S. Pat. No. 6,614,456 B1 filed on Jan. 19, 2000, and incorporated herein by reference in its entirety.

As shown in FIG. 4, the basic features portion 320 includes a scan location parameter 321, an input original document size parameter 322, an original image quality profile parameter 323, a mode parameter 324, a resolution parameter 325, and image optimization parameter 326. The image quality portion 330 includes an image quality profile parameter 331, a brightness parameter 332, an increase/decrease parameter 333, a special tone adjustments parameter 334, a sharpen/soften parameter 335, a background suppression parameter 336 and a negative image parameter 337.

In particular, the scan location parameter 321 indicates the particular electronic image capture device that is to be used to capture electronic image data from a particular original document. The page size parameter portion 322 indicates the size of the input document, whether the input document is single-sided or double-sided, and, if the original document is double-sided, how the two images on each side of the original document are oriented relative to each other. The image quality profile portion 323 indicates image characteristics of and enhancements to be applied to the original document when it is made into its electronic form. Image quality profiles are described in greater detail in U.S. patent application Ser. No. 09/487,269, filed on Jan. 19, 2000 and incorporated herein by reference in its entirety. The mode portion 324 indicates the particular image capture mode to be used. For example, the image of the original document could be captured as a binary bitmap image, as shown in FIG. 4 or, as an 8-bit grayscale image, or as a color image having various color spaces and bit depths.

The resolution portion 325 indicates the resolution of the generated electronic image data. The image optimization portion 326 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 331 of the image quality portion 330 is the same as the image quality profile parameter 323. The lighten/darken parameter 332 indicates whether the electronic image data is to be lighter or darker than the images on the original document. Similarly, the increase/decrease contrast parameter portion 333 indicates whether the contrast of the electronic image data is to be greater or less than the contrast of the images on the original document. The special tone adjustment parameter portion 334 is used to provide finer control over the tone reproduction curve that is used to convert the continuous tone image values of the original document to the multi-bit-depth image values of the generated electronic image data. This is described in greater detail in the incorporated U.S. Pat. No. 6,614,456 B1.

The sharpen/soften parameter portion 335 used to indicate whether the edges within the images in the original document should be sharpened or softened in the generated electronic image data. The background suppression parameter portion 336 is used to indicate whether background suppression should be used, and if so, the color or other quality of the background of the original document that is to be suppressed. The negative image parameter portion 337 indicates whether the generated electronic image data should be a negative image relative to the images on the original document. Various other ones of the particular scanning parameters discussed above are further disclosed in U.S. patent application Ser. No. 09/487,273, U.S. patent application Ser. No. 09/487,274 and U.S. Pat. No. 6,697,091 B 1, each filed on Jan. 19, 2000, and each incorporated herein by reference in its entirety.

Figure 5:
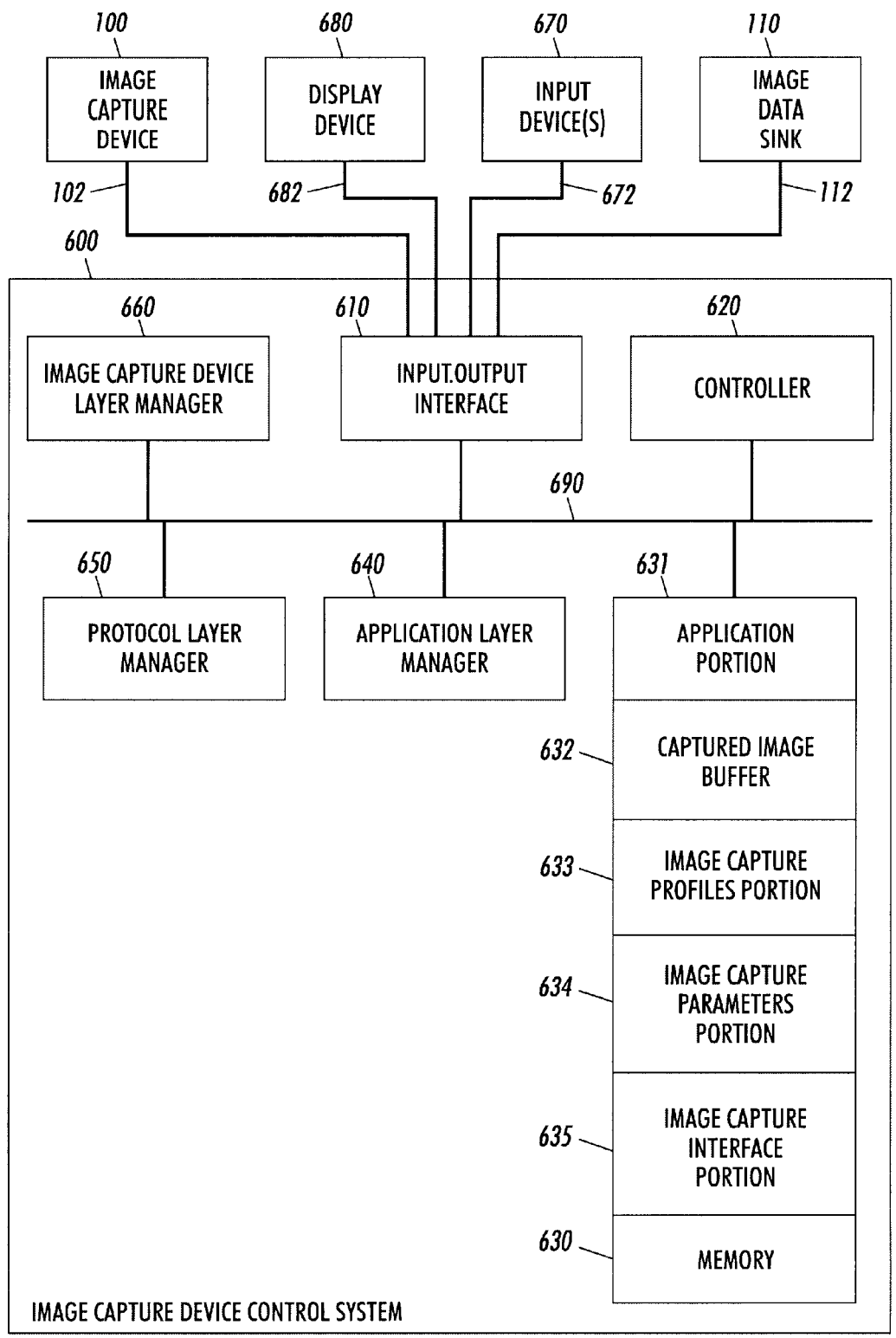
FIG. 5 is a block diagram of a second exemplary embodiment of the image capture control system that incorporates the image previewing systems, methods and graphical user interfaces of this invention.

FIG. 5 is a block diagram illustrating a second exemplary embodiment of the structural organization of an image captured device control system 600 that incorporates the image previewing systems methods and graphical user interfaces according to this invention. As shown in FIG. 5, the image capture device control system 600 includes an input/output interface 610, a controller 620, a memory 630, an application layer manager 640, a protocol layer manager 650, and an image capture device layer manager 600, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620 the image capture device layer manager 660, the protocol layer manager 650 and/or the application layer manager 640.

The image capture profiles portion 633 stores the image capture profiles, as set forth in the incorporated 269 application, as well as job tickets 300, and the like. The image capture parameters portion 634 stores a current set of the image capture parameters to be used by the image capture device 100 when capturing an image. The image capture interface portion 635 stores the various graphical user interfaces shown in FIGS. 3, 4, and 6 and as described above and in detailed below.

The application layer manager 640 manages the application layer 240, and in particular, the application portions 242 of any executing applications 260.

The protocol layer manager 650 manages the protocol layer 230, including the source manager 234. The protocol layer manager 650 communications with the application layer manager 640 using the TWAIN™ application programming interfaces 236 of the executing applications 260.

The image capture device layer manager 660 manages each of the TWAIN™ drivers (or data sources) 250 that may be implemented for different ones of the image capture devices 100 that may be accessible by the image capture device control system 600 over various ones of the links 102. In particular, the image capture device layer manager 660 communicates with the protocol layer manager 650 using the acquisition layer application programming interface 232 of the particular TWAIN™ driver (or data source) 250. Similarly, the image capture device layer manager 660 communications with the image capture device 100 through the input/output interface 610 and over the link 102 using the device interface portion 212.

The image capture device layer manager 660 causes various ones of the image capture graphical user interfaces, such as the graphical user interface 400 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 640. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
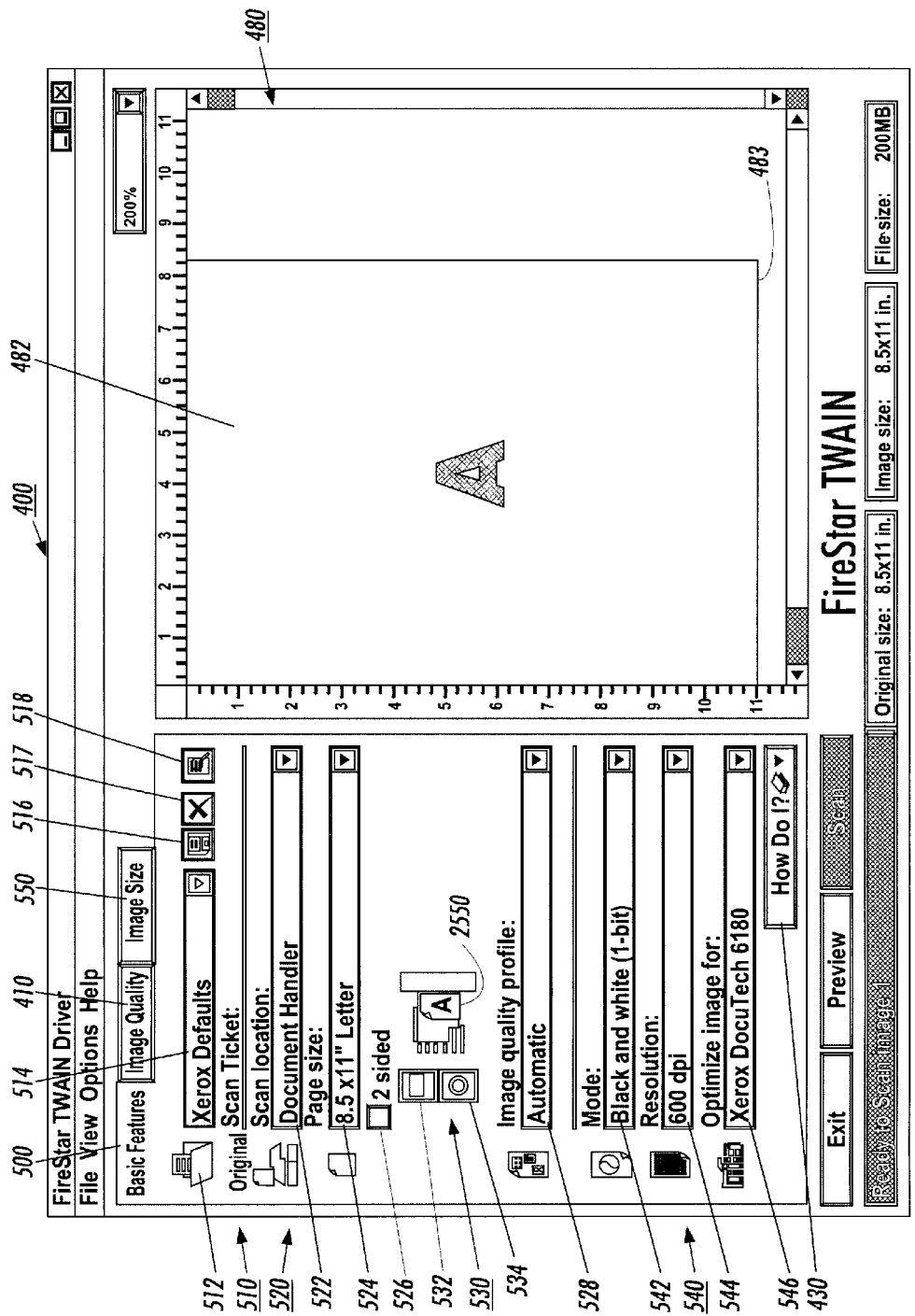
FIG. 6 is a graphical user interface for a scanner driver according to this invention.

FIG. 6 shows one exemplary embodiment of the graphical user interface 400 including a task-specific user instruction button 430. As shown in FIG. 6, the graphical user interface 400 includes the image quality tab 410 and the image size tab 550 in addition to the basic features tab 500. The basic features tab 500 includes a scan ticket portion 510, an original document parameters portion 520, and an image capture parameters portion 540. The image quality tab 410 is described in greater detail in the incorporated U.S. Pat. No. 6,614,456 B1. The basic features tab 500 is described in greater detail in the incorporated 274 application and the incorporated U.S. Pat. No. 6,697,091 B1 The image size tab 550 is described in greater detail in the incorporated 273 application.

Each of the basic features, image quality and image size tabs 500, 410 and 550 also include an instance of the task-specific user instruction button 430. The task-specific user instruction button 430 is usable to access an operating instructions help function, as disclosed in greater detail below.

The scan ticket portion 510 includes a status icon 512 that indicates the saved status of the scan ticket indicated in a scan ticket selection box 514. The current image capture parameters input into each of the basic features tab 500, the image quality tab 410 and the image size tab 550 can be saved to the scan ticket named in the scan ticket dialogue box 514 by selecting the save scan ticket button 516. In contrast, the named scan ticket displayed in the scan ticket dialogue box 514 can be deleted by selecting the delete scan ticket button 517. The show scan ticket button 518 allows the user to quickly view all of the currently loaded scan settings in a text list. This allows the user to view the information on every setting without having to navigate all of the various dialogues in the various portions of the graphical user interface 400.

The original document parameters portion 520 of the basic features tab 500 includes a scan location list box 522, a page size list box 524, a double-sided check box 526, and an image quality profile list box 528. The original document portion 520 also includes a document orientation portion 530, described in greater detail below, that allows the user to specify how the document will be oriented on the platen 120 of the image capture device 100.

The image quality profile list box 528 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 528 will include the same image quality profiles as will be provided on the image quality tab. When an image quality profile is selected using the image quality profile list box 528, the image quality profile parameters displayed in the various portions of the image quality tab will be change accordingly.

The image capture parameters portion 540 of the basic feature tab 500 includes a mode list box 542, a resolution list box 544, and an optimize image list box 546. The mode list box 542 allows the user to select the output mode of the image capture device 100. It should be appreciated that the particular modes displayed when the mode list box 542 is selected will depend on the particular image capture device identified in the scan location list box 522 and the particular modes available with that particular image capture device. The possible modes, include, but are not limited to, 1-bit or black/white captured images, 8-bit or grayscale captured images, or various types of 24-bit captured images, including red/green/blue (RGB) color, standard red/green/blue (sRGB) color and Luminance/Blue Chromaticity/Red Chromaticity (YCbCr) color.

The resolution list box 544 allows the user to select the output resolution of the captured image, in dots per inch (dpi). The optimize image list box 546 allows the user to select the output device for which the various captured image quality parameters on the image quality tab 410 should be set to so that the captured image, when printed on the selected output device, will provide the highest quality output image. In particular, in one exemplary embodiment, when a printer is selected in the optimize image list box 546, the tone reproduction curve (TRC) for the 1-bit (black/white) mode is selected as the tone reproduction curve for the indicated printer.

Figure 7:
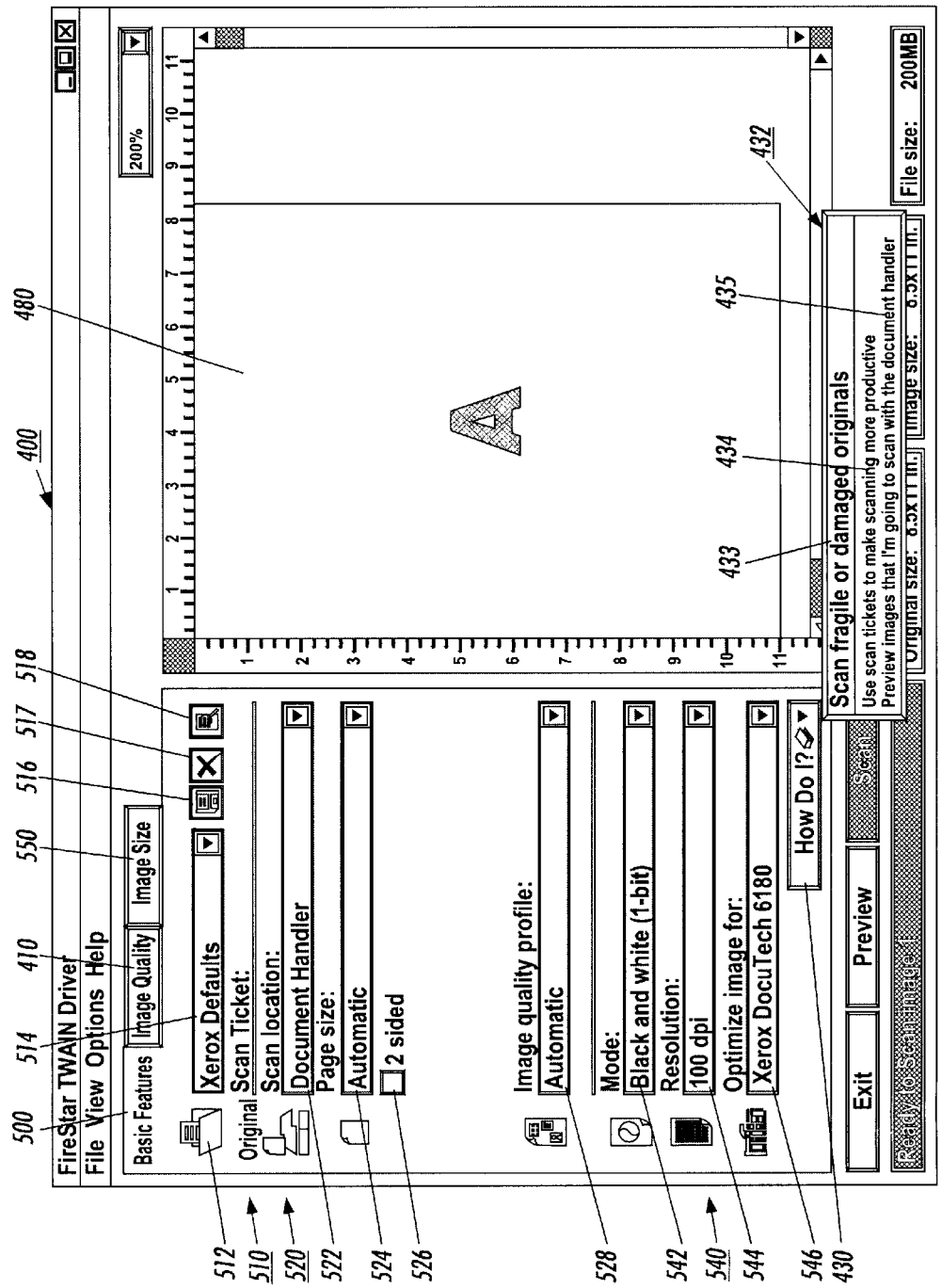
FIG. 7 shows the graphical user interface of FIG. 6 after the task-specific user instruction button has been selected.

FIG. 7 shows the graphical user interface 400 after the task-specific user instruction button 430 has been selected. In particular, upon selecting the task-specific user instruction button 430, a pop-up menu 432 is displayed. This task pop-up menu 432 includes a list of tasks that are specific to the displayed portion of the graphical user interface 400. In FIG. 7, the displayed portion of the graphical user interface 400 is the basic features tab 500 and the preview pane 480. It should be appreciated that, if the image quality tab 410 or the image size tab 550, or any other portion of the graphical user interface 400, were displayed instead, the various menu items on the task pop-up menu 432 would be appropriate for those displayed portions of the graphical user interface 400.

Figure 8:
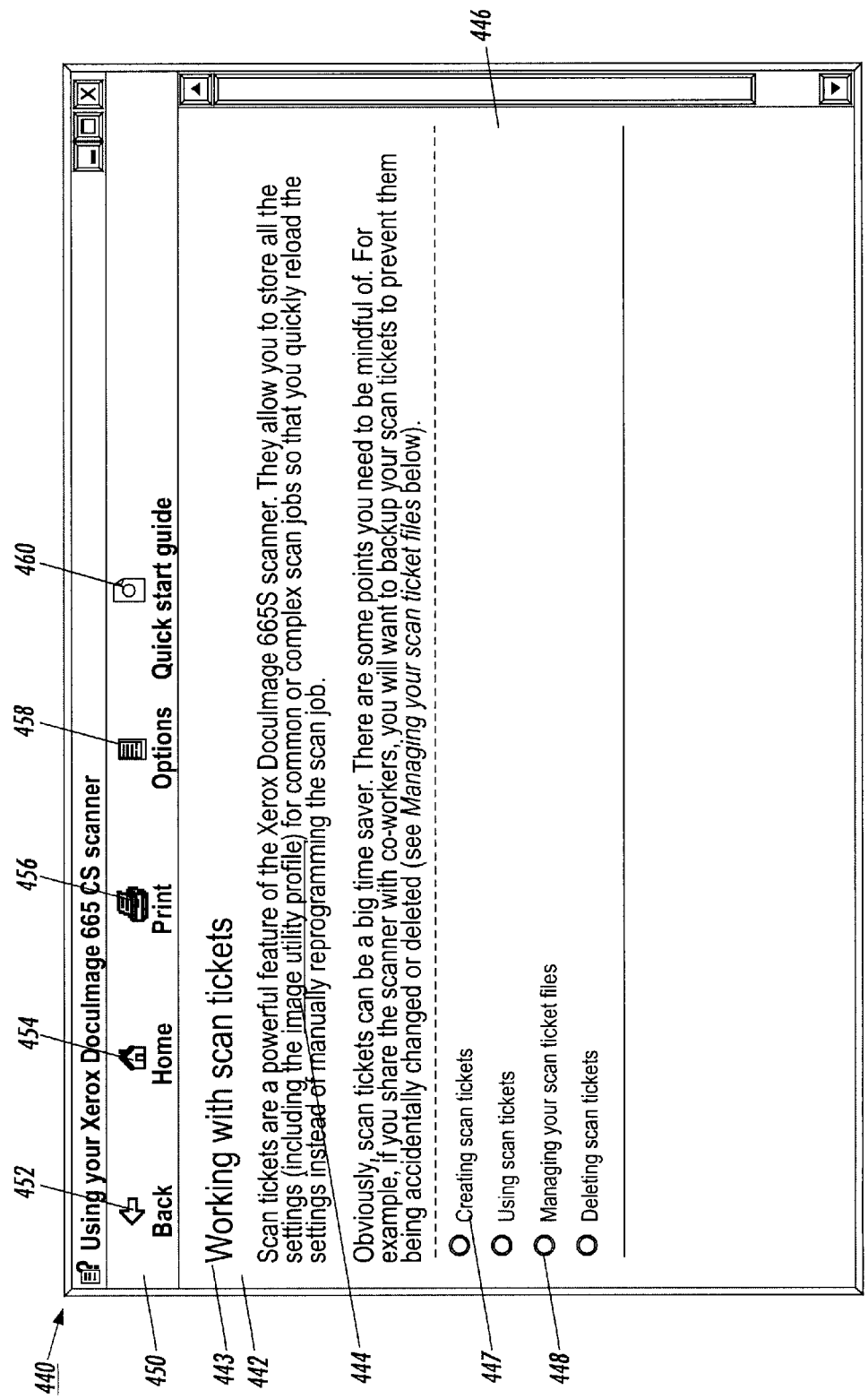
FIG. 8 is a task-specific user instruction graphical user interface accessed by selecting the task-specific user instruction button of FIGS. 6 and 7.

In particular, as shown in FIG. 7, the task pop-up menu 432 includes a number of selectable task identifiers 433–435 for the basic features and preview pane portions of the graphical user interface 400. In particular, the selectable task identifier 433 relates to a task that involves the particular scan location to be identified in the scan location box 522. Similarly, the selectable task identifier 434 relates to tasks that involve using the scan ticket portion 510. Finally, the selectable task identifier 435 relates to tasks that can be accomplished using the preview pane 480. In response to selecting one of the selectable task identifiers 433–435, a task-specific user instruction graphical user interface 440, as shown in FIG. 8, is displayed. In particular, the task-specific user instruction graphical user interface 440 will display instructions related to the selected selectable task identifier.

As shown in FIG. 8, the task-specific user instruction graphical user interface 440 includes a task instruction portion 442 and a related tasks portion 446. The task-specific user instruction graphical user interface 440 also includes a browser-type menu 450.

The browser-type menu 450 includes a Back button 452, a Home button 454, a Printer button 456, an Options button 458 and a Quick Start Guide button 460. The Back, Home, Print and Options buttons 452–458 operate in the conventional manner. Thus, no further description of these buttons is required. The Quick Start Guide button 460, when selected, causes a quick start guide document to be displayed.

The task instruction portion 442 displays a description of the task to be performed that corresponds to the selected selectable task identifier displayed in the task pop-up menu 432. As shown in FIG. 8, the task instructions 443 displayed in the task instruction portion 442 can include one or more terms or phrases that have a selectable element 444 associated with that term or phrase. Selecting the selectable element 444 can result in either or both of a help entry corresponding to the associated term or phrase being displayed, or a list of one or more task identifiers associated with tasks related to the associated term or phrase being displayed in the related tasks portion 446.

The related tasks portion 446 includes one or more task identifiers 447 that are associated with tasks that are related to the task description 443 displayed in the task instruction portion 442. In particular, each task identifier 447 that identifies a related task has a radio button 448 associated with it. Selecting the radio button 448 associated with one of the task identifiers 447 for a related task causes the task description 443 associated with that related task to be displayed in the task instruction portion 442, and the task identifiers 447 of tasks related to that selected related task 447 to be displayed in the related tasks portion 446. In this way, the user can navigate through a series of closely related tasks to obtain sufficient information to accomplish any arbitrarily complex task. Once the user has finished interacting with the task-specific user instruction graphical user interface 440, the user closes the task-specific user instruction graphical user interface to return to the scanner control graphical user interface 400.

Figure 9A:
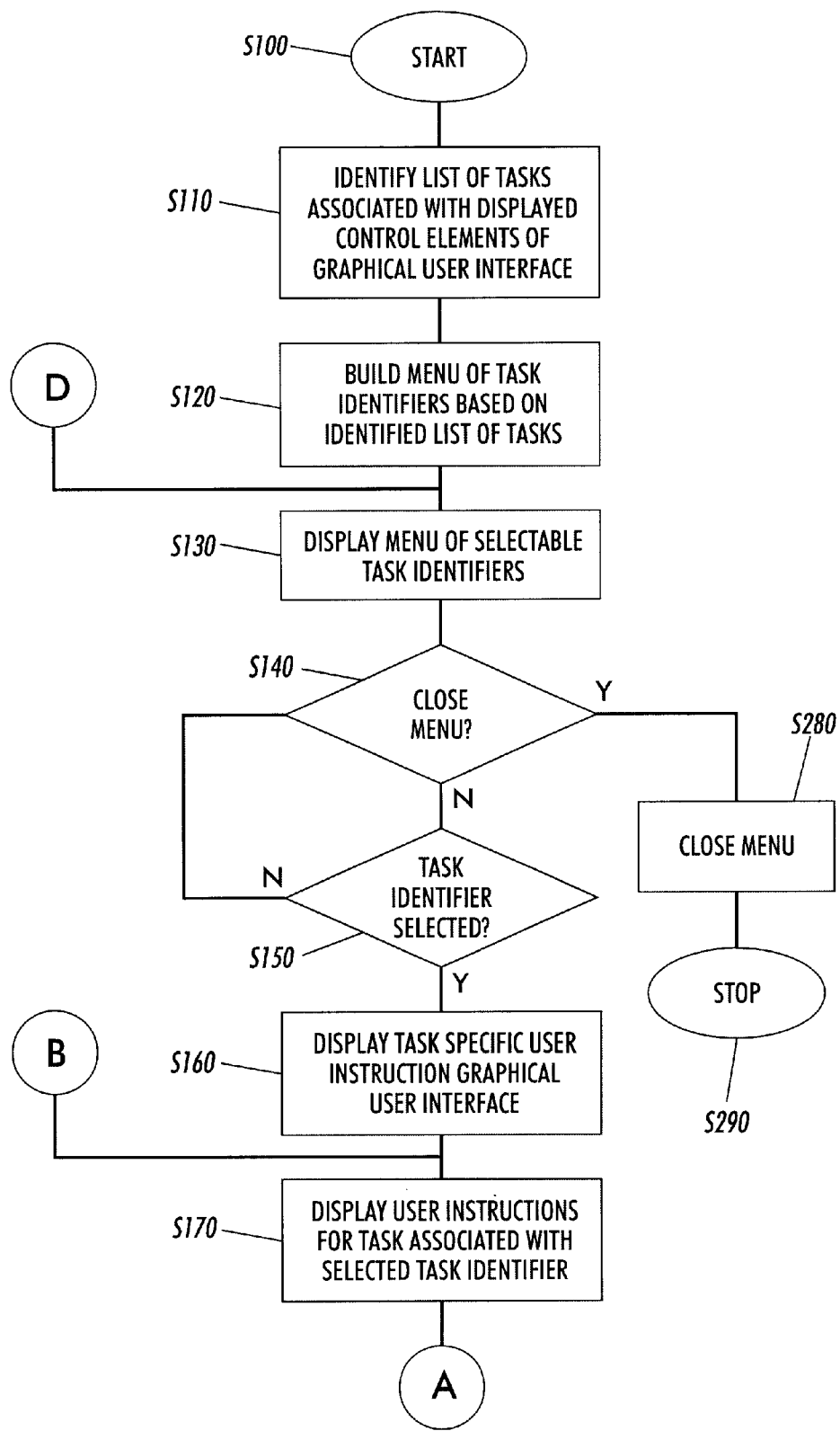
FIGS. 9A–9C are a flowchart outlining one exemplary embodiment of a method for using task-specific user instructions according to this invention.
Figure 9B:
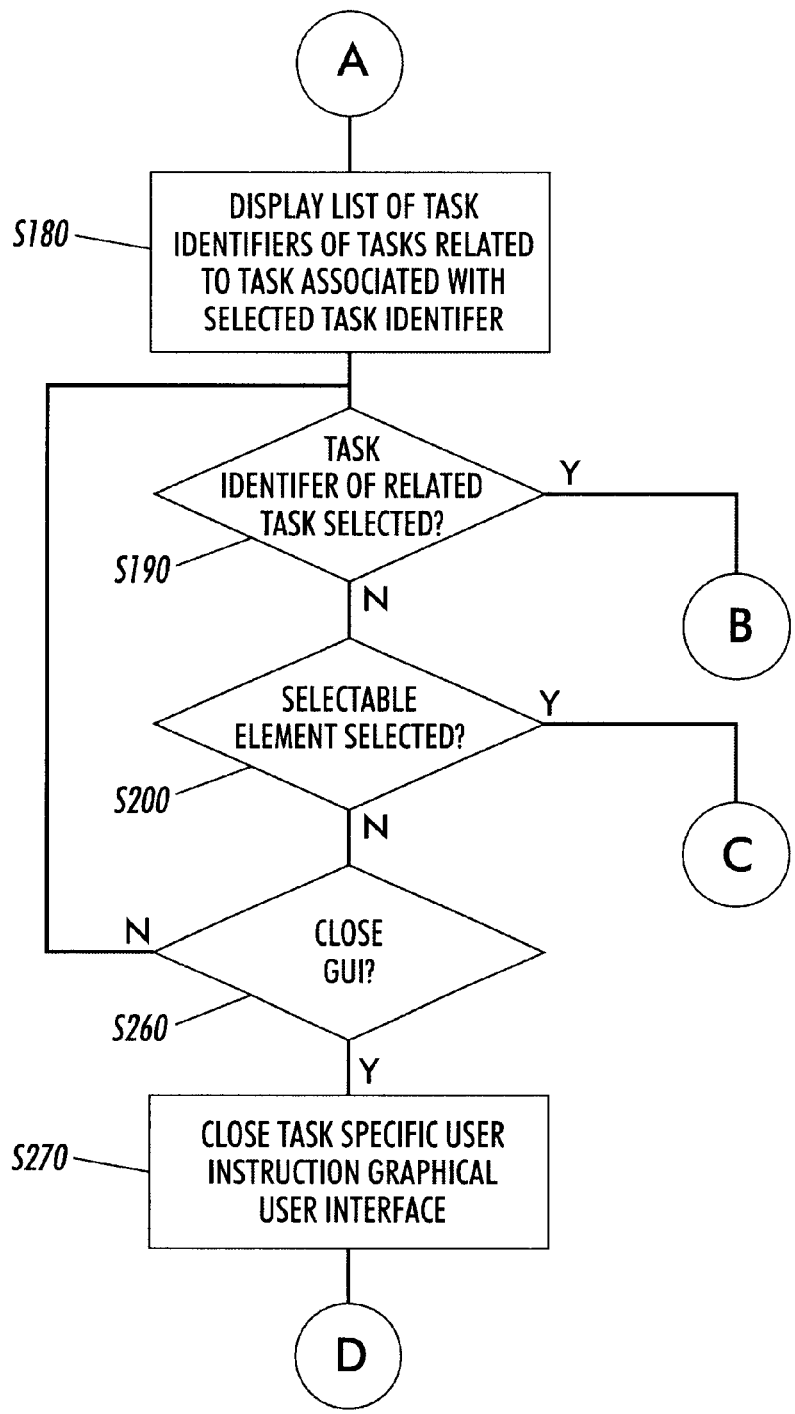
Figure 9C:
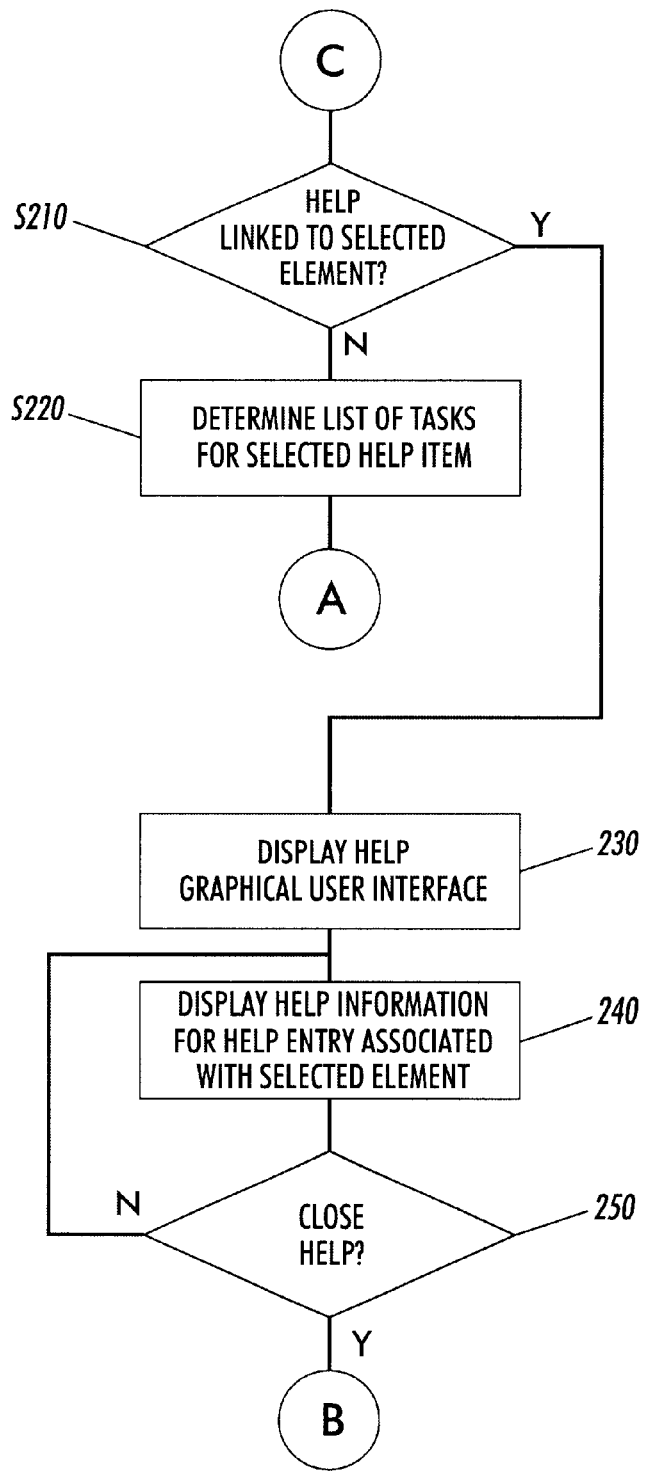

FIGS. 9A–9C are a flowchart outlining one exemplary embodiment of a method for using a task-specific user instruction button to access tasks specific to displayed portions of an active graphical user interface according to this invention.

Control begins in step S1100, upon the user selecting the task-specific user instruction button. Accordingly, control continues to step S100, where a list of tasks associated with the currently displayed control elements of the currently displayed graphical user interface is identified. Next, in step S120, a task menu of task identifiers associated with the identified tasks is built based on the list of identified tasks. Then, in step S130, the task menu of selectable task identifiers is displayed to the user. Control then continues to step S140.

In step S140, a determination is made whether the user has closed the task-specific user instruction graphical user interface. If not, control continues to step S150. Otherwise, control continues to step S280, where the task-specific graphical user interface is closed. Control then continues to step S290, where the method ends.

In step S150, a determination is made whether the user has selected one of the selectable task identifiers displayed in the task menu. If so, control continues to step S150. Otherwise, control jumps back to step S140.

In step S160, a task-specific user instruction graphical user interface is displayed. Next, in step S170, the task instructions associated with the task corresponding to the selected task identifier is displayed in a task instruction portion of the task-specific user instruction graphical user interface. Then, in step S180, one or more selectable task identifiers are displayed based on a predetermined list of task that are related to the task corresponding to the task instructions displayed in the task instruction portion of the task-specific user instruction graphical user interface. Control then continues to step S190.

In step S190, a determination is made whether one of the selectable task identifiers displayed in the related tasks portion of the task-specific user instruction graphical user interface has been selected. If so, control jumps back to step S170, where the task instructions for the task corresponding to the selected related task is displayed in the task instruction portion of the task-specific user instruction graphical user interface. Otherwise, control continues to step S200.

In step S200, a determination is made whether a selectable element corresponding to a term or phrase in the task instructions displayed in the task instruction portion of the task-specific user instruction graphical user interface has been selected. If so, control continues to step S210. Otherwise, control jumps to step S260.

In step S210, a determination is made whether the selectable element is linked to an entry in a help menu or to a related task. If the selectable element is linked to a related task, control continues to step S220. Otherwise, control jumps to step S230.

In step S220, a list of tasks related to the term or phrase associated with the selected selectable element is determined. Control then jumps back to step S180, where the selectable task identifiers are displayed in the related tasks portion of the task-specific user instruction graphical user interface, either in place of, or in addition to, the task identifiers previously displayed in the related tasks portion.

In contrast, in step S230, a help graphical user interface is displayed. Then, in step S240, a help entry corresponding to the term or phrase associated with the selected selectable element is displayed in a help information portion of the help graphical user interface. Next, in step S250, a determination is made whether the user has selected to return to the task-specific user instruction graphical user interface. If not, control jumps back to step S240. Otherwise, control jumps to step S170.

Figure 10:
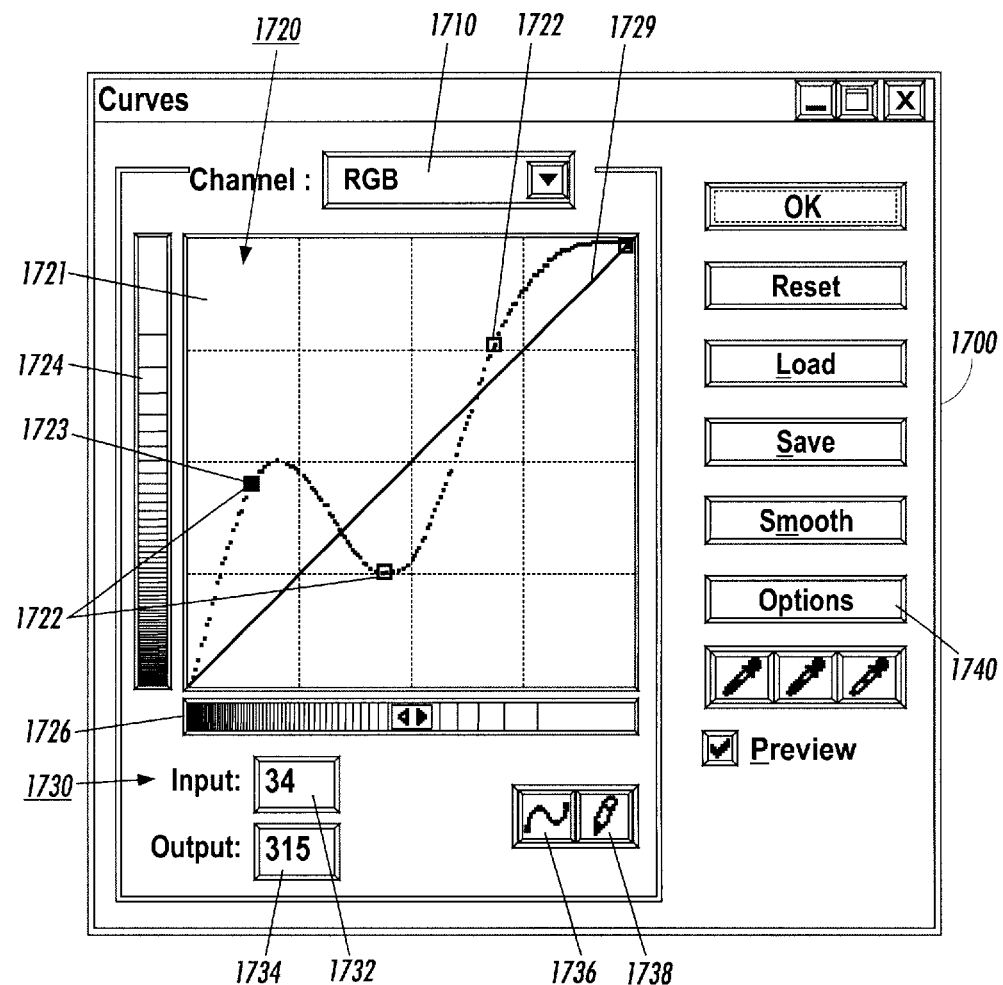
FIG. 10 shows one exemplary embodiment of a convention tone reproduction curve control graphical user interface.

FIG. 10 shows one exemplary embodiment of a conventional tone reproduction curve control graphical user interface 1700. As shown in FIG. 10, the conventional tone reproduction curve control graphical user interface 1700 includes a channel selection list box 1710, a tone reproduction curve adjusting portion 1720 and a control portion 1730. In particular, the channel selection list box 1710 is used to select the particular tone reproduction curve to be adjusted using the tone reproduction curve adjusting portion 1720. That is, each different type of image, such as a binary image, a black/white grayscale image, a red/green/blue (RGB) image, and the like, will have a different tone reproduction curve that converts the image values of the input document or electronic image data into the image values of the output document or electronic image data.

The tone reproduction curve adjusting portion 1720 includes a curve portion 1720 comprising a graph portion 1721 in which the tone reproduction curve is plotted and a plurality of selectable tone reproduction points 1722 that can be positioned within the graph 1721. An output image value scale 1724 and an input image value scale 1726 are positioned adjacent to the vertical and horizontal axes of the graph portion 1721, respectively. Each of the scale portions 1724 and 1726 illustrate the range of input and output image values, respectively. A set of control buttons are positioned in the input image value scale 1726 and allow the user to adjust the input image value associated with a currently selected one of the tone reproduction curve points 1722, such as the currently selected tone reproduction curve point 1723.

The control portion 1730 includes an input text box 1732 and an output text box 1734. The control portion 1730 also includes a curve fitting button 1736 and a tone reproduction curve point insert button 1738. The input text box 1732 indicates the current input image value of the selected tone reproduction curve point 1723, while the output text box 1734 indicates the output image value of the selected tone reproduction curve point 1723. It should be appreciated that the location of the selected tone reproduction curve point 1723 and the graphic portion 1721 can be altered in two ways. First, the user can select the selected tone reproduction curve point 1723 using a mouse or other input device to drag that selected tone reproduction curve point 1723 to a new location within the graph portion 1721. As a result, the image values displayed in the input/output text boxes 1732 and 1734 will change accordingly. In contrast, the user can place the cursor in either of the input or output text boxes 1732 or 1734 and enter a new image value in either box. As a result, the selected tone reproduction curve point 1723 will be redrawn at the updated coordinates displayed in the input and output text boxes 1732 and 1734.

The tone reproduction curve point insert button 1738 is used to add additional tone reproduction curve points 1722 to the graph portion 1721. Once all of the desired tone reproduction curve points 1722 have been entered by the user into the graph portion 1721, the user can select the curve fitting button 1736 to fit a curve to or through the inserted tone reproduction curve points 1722. The particular type of curve fitting performed upon selecting the curve fitting button 1736 is selected using the options button 1740.

Once the various tone reproduction curve points 1722 are positioned by the user at the desired location within the graph portion 1721, the tone reproduction curve is fit to the tone reproduction curve points 1722. In particular, the tone reproduction curve can be fit to the tone reproduction curve points 1722 such that it passes through each of the tone reproduction curve points 1722, so that the smoothest possible curve, of the lowest possible dimension, is created. Alternatively, in various exemplary embodiments, a tone reproduction curve having a selected dimension is drawn so that it best fits the tone reproduction curve point 1722, but need not pass through each, or any, of the tone reproduction curve point 1722, except the extreme points.

Although it is not a part of the graphical user interface 700, a line 1729 has been drawn in the graph portion 1722. This line 1729 illustrates a zero adjustment condition. That is, the line 1729 represents a tone reproduction curve where the output image value is equivalent for all values to the corresponding input image value. Those portions of the tone reproduction curve that lie above and to the left of the line 1729 represent output image values that are lighter than the corresponding input image values. In contrast, those portions of the toner reproduction curve that lie below and to the right of the line 1729 represent output image values that are darker than the corresponding input image values. Where the tone reproduction curve crosses the line 1729, the tone reproduction curve points lying at those locations represent output image values that are equivalent to the image input values.

Because the graphical user interface 1700 does not include the line 1729, (i.e., this line 1729 was included in this Figure for explanation purposes only), it is often very difficult, even for sophisticated users, to fully appreciate the effects that the user's adjustments to the tone reproduction curve plotted in the graph portion 1721 will have on the output image.

Figure 11:
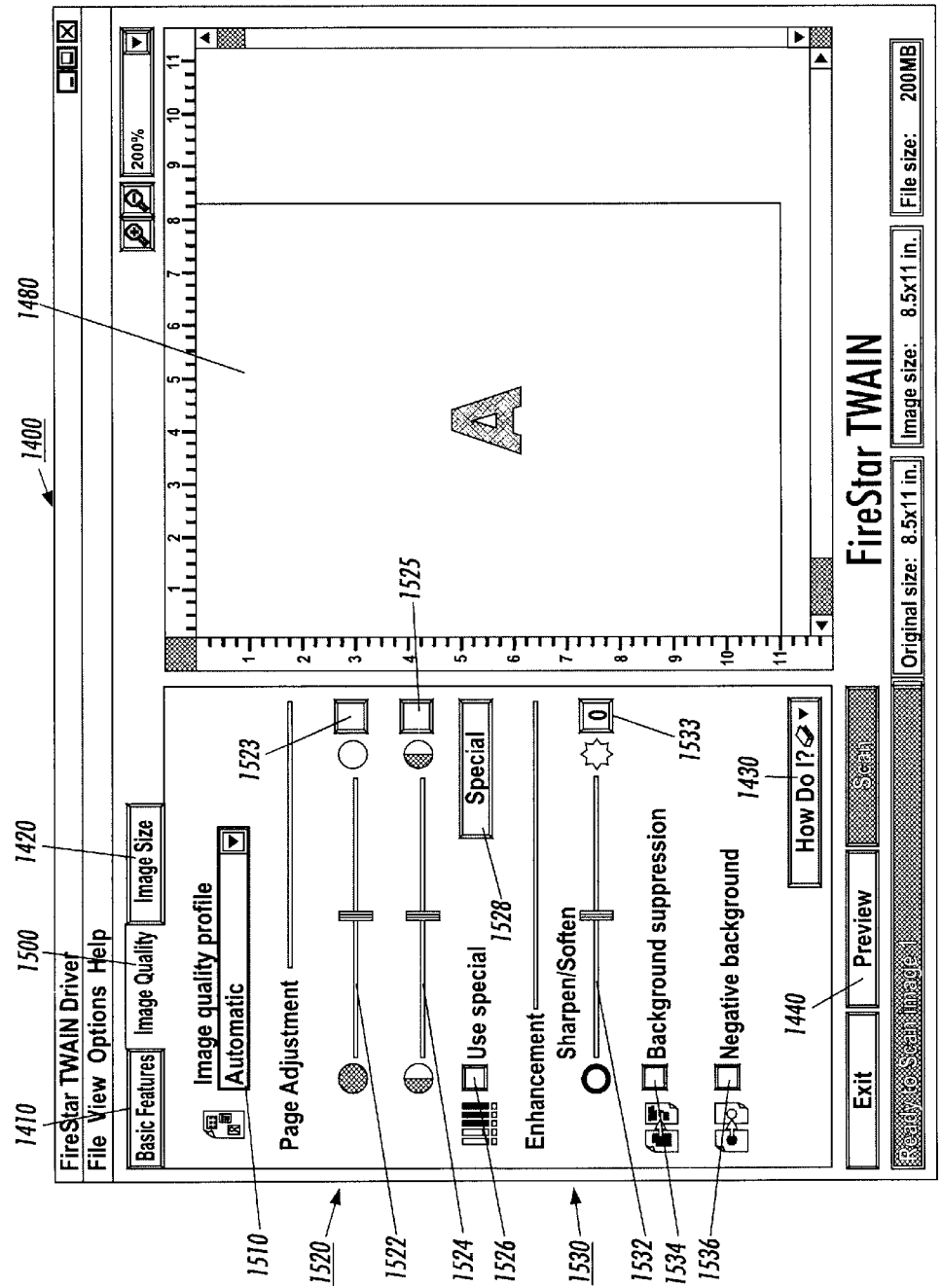
FIG. 11 shows one exemplary embodiment of a graphical user interface usable with the image quality response curve control graphical user interfaces, systems and methods according to this invention.

FIG. 11 shows one exemplary embodiment of a graphical user interface usable with the tone reproduction curve control graphical user interfaces, systems and methods according to this invention. As shown in FIG. 11, the graphical user interface 1400 includes the basic features tab 1410 and the image size tab 1420 in addition to the image quality tab 1500. The basic features tab 1410 is disclosed in greater detail in the incorporated the 274 application. The image size tab 1420 is disclosed in greater detail in the incorporated the 273 and 274 applications. The "How Do I" button 1430 is usable to access the operating instructions help function as already discussed in detail above. A preview scan can be generated and displayed in the preview pane portion 1480 by selecting the preview button 1440.

As shown in FIG. 11, the image quality tab 1500 includes an image quality profile list box 1510, an image adjustments portion 1520 and an image enhancements portion 1530, in addition to an instance of the "How Do I ?" button 1430. The image quality profile list box 1510 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 1510 will include the same image quality profiles as will be provided on the image quality tab. When an image quality profile is selected using the image quality profile list box 1510, the image quality profile parameters displayed in the various portions of the image quality tab will be change accordingly.

The image adjustments portion 1520 includes a lighten/darken slider 1522, a lighten/darken value text box 1523, an increase/decrease contrast slider 1524 and an increase/decrease contrast value text box 1525. The lighten/darken slider 1522 is used to change the overall relationship between the lightness or darkness of the captured electronic image relative to the image on the original document. The lighten/darken value text box 1523 indicates the numerical value of the lighten/darken slider 1522. Similarly, the increase/decrease contrast slider 1524 allows the user to adjust the contrast of the captured electronic image relative to the image on the original document. The increase/decrease contrast value text box 1525 indicates the value of the increase/decrease contrast slider 1524.

Figure 12:
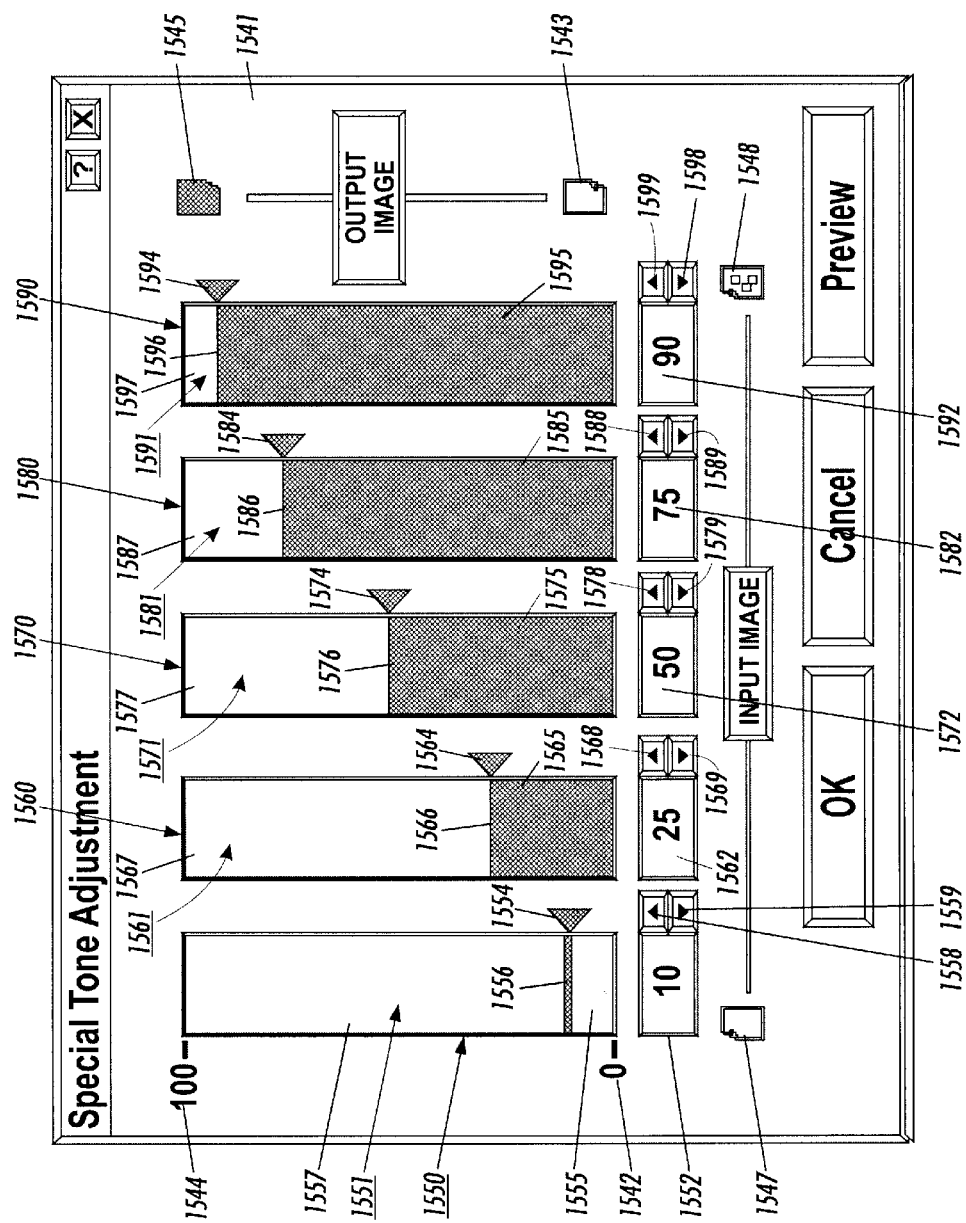
FIG. 12 shows one exemplary embodiment of an image quality curve control graphical user interface according to this invention.

The image adjustments portion 1520 also includes a "Use Special" check box 1526 and a "Special Adjustments" access button 1528. When the Use Special check box 1526 is checked, the tone reproduction curve adjustments entered using the special tone adjustments graphical user interface shown in FIG. 12 are used in place of the standard adjustments applied by the lighten/darken slider 1522 and the increase/decrease contrast slider 1524. The Special Adjustments button 1528 is used to access the special tone adjustments graphical user interface 1540 shown in FIG. 12 and described in greater detail below. In addition, when the Use Special check box 526 is checked, the lighten/darken slider and value text box 1522 and 1523 and the increase/decrease contrast slider and value text box 1524 and 1525 are disabled. Thus, as shown in FIG. 12, the appearance of these elements of the image adjustments portion 1520 is changed to a "grayed-out" appearance.

The enhancements portion 1530 includes a sharpen/soften slider 1532, a sharpen/soften value text box 1533, a background suppression check box 1534 and a negative image check box 1536. The sharpen/soften slider 1532 allows the user to adjust the sharpness of the output image relative to that of the image on the original document. The sharpen/soften value text box 1533 indicates the value of the sharpen/soften slider 1532. It should be appreciated, as indicated above, that other instances of the response curve graphical user interface shown in FIG. 12 can be used to provide fine adjustments to the contrast and to the sharpness of the output image relative to the input image, as well as the lightness/darkness control provided by the tone reproduction curve.

When the background suppression check box 1534 is checked, the background suppression function is enabled. Similarly, when the negative image check box 1536 is checked, the output image is generated as a negative image relative to the image on the original document. In particular, this inverts the output image values of the captured electronic image relative to the image values of the image on the original document. That is, an image value of the image on the original document of 0 is converted to an image value of the captured electronic image of 255, and vice versa.

FIG. 12 illustrates one exemplary embodiment of a special adjustment graphical user interface 1540 that can be accessed by the selecting the Special Adjustments button 1528 of the image quality tab 1500. As shown in FIG. 12, the special adjustment graphical user interface 1540 includes a plurality of slider portions 1550, 1560, 1570, 1580 and 1590, each of which corresponds to a defined image value, or range of image values, of the input image force particular associated image quality.

Each of the slider portions 1550–1590 includes a slider 1551, 1561, 1571, 1581 and 1591, respectively, and a numerical portion 1552, 1562, 1572, 1582 and 1592, respectively. Each of the sliders 1551–1591 includes a slider pointer 1554, 1564, 1574, 1584 and 1594, respectively, and an associated slider bar 1556, 1566, 1576, 1586 and 1596, respectively. Each of the slider bars 1556–1596 divides the corresponding slider 1551-1591 into bottom and top portions 1555 and 1557, 1565 and 1567, and 1575 and 1577, 1585 and 1587 and 1595 and 1597, respectively. An appearance of each of the bottom portions 1555–1595 is determined based on the position of the corresponding slider pointer 1554-1594 and the associated slider bar 1556-1596 relative to the top and bottom ends of the slider 1551-1591, the particular image quality that is being adjusted, and the particular range of image quality values and extreme values associated with the top and bottom edges of the sliders 1551–1591.

The special adjustment graphical user interface 1540 includes a lower scale value indicator 1542 and an upper scale value indicator 1544. In the particular exemplary embodiment of the special adjustment graphical user interface 1540 shown in FIG. 12, each of the slider portions 1550–1590 uses a linear scale having a lower scale value of 0% and an upper scale value of 100%. However, it should be appreciated that any type of scale ruler could be used.

The special adjustment graphical user interface 1540 also includes an image quality indicator portion 1541, including a first range end indicator 1534 and a second range end indicator 1545. It should be appreciated that the special adjustment graphical user interface 1540 can be used to provide fine-resolution adjustments to any desired image quality, such as the lightness/darkness, the contrast, the sharpness, or any other known or later-developed image quality. Thus, it should be appreciated that the special adjustments graphical user interface 1540 is not limited to adjusting only the tone reproduction curve. In particular, the special adjustment graphical user interface 1540 can have different instantiations for any of the different image qualities for which fine-resolution adjustments are to be provided.

The special adjustments graphical user interface 1540 is particularly useful for providing fine-resolution adjustments of the tone reproduction curve for converting the input image values to the output image values. Thus, in the particular exemplary embodiment of the special adjustments graphical user interface 1540 shown in FIG. 12, the image quality being adjusted is the tone reproduction curve that converts the image values of the input image to the image values of the output image. Accordingly, the first range end indicator 1543, which indicates one extreme end of the range of output values for the particular image quality being adjusted, in this exemplary embodiment of the special adjustment graphical user interface 1540 represents an extremely lightened image. In contrast, the second range end indicator 1545, in this exemplary embodiment of the special adjustment graphical user interface 1540, represents an extremely darkened image.

Similarly, an input image quality portion 1546, which in most cases will indicate the same image quality as indicated in the image quality portion 1541, includes a first range end indicator 1547 and a second range end indicator 1548. In particular, the first and second range end indicators 1547 and 1548 provide visual cues to the user so that the user can visually identify which value or range of values, of the image quality being adjusted, are associated with each of the slider portions 1550–1590.

Each of the numerical portions 1552, 1562, 1572, 1582 and 1592 indicate the numerical value of the corresponding slider pointer 1554–1594 and slider bar 1556–1596 within the range indicated by the range indicators 1542 and 1544. Each of the numerical portions 1552–1592 includes a pair of increase and decrease value buttons 1558 and 1559, 1568 and 1569, 1578 and 1579, 1588 and 1589, and 1598 and 1599, respectively, that allow the user to directly increase or decrease the numerical value of the corresponding numerical portion 1552–1592. When the user uses the increase buttons 1558–1598 or the decrease buttons 1559–1599 to increase or decrease the numerical value in the corresponding numerical portion 1552–1592, the position of the corresponding slider pointer 1554–1594 and the corresponding slider bar 1556–1596 within the corresponding slider 1551–1591 is adjusted up or down, respectively. At the same time, the visual appearance of the corresponding bottom portion 1555–1595 is adjusted to reflect the new numerical value of the corresponding numerical portion 1552–1592.

In this way, the slider portions 1550–1590 provide an intuitive visual indication to the user of the effect the selected value in each of the slider portions 1550 has on the corresponding value or range of values of the associated image quality on the output image relative to the input image. Thus, in the exemplary embodiment of the special adjustment graphical user interface 1540 shown in FIG. 12, which is used to adjust the tone reproduction curve, the user can quickly visually determine that the middle input image values represented by the slider portions 1560, 1570 and 1580 essentially remain unchanged in the output image, while the extreme values represented by the slider portions 1550 and 1590 are moved towards the center, i.e., 50%, value.

As indicated above, each of the slider portions 1550–1590 can represent a single value of the image quality of the input image, or can represent a range of values of the image quality of the input image. If each of the slider portions 1550–1590 represents a single value, the response curve for converting the values of the associated image quality for the input image to the values of the associated image quality for the output image can be created as outlined in any of the exemplary embodiments discussed above with respect to the graphical user interface 1700. Thus, a curve could be fit to the values selected using the slider portions 1550–1590. In contrast, a curve could be fit so that it passes between, but does not necessarily include, the values indicated in the slider portions 1550–1590. Similarly, if each of the slider portions represents a range of values of the selected image quality of the input image, any known or later developed method for generating a conversion curve could be used.

It should be also be appreciated that, rather than indicating the percentage of the output range that is indicated by the slider pointer 1554–1594 and the slider bar 1556–1595, the range of the slider portions 1550–1590 could instead be functions of the represented image values or range of image values. For example, the range of the slider portions 1550–1590 could extend between 0% and 200% of the represented image value or range of image values, with the center position representing the 100% function. In this way, moving the slider pointers 1554–1594 and the slider bars 1556–1596 downward causes the represented image value or range of image values of the input image to be proportionally reduced when creating the output image. In contrast, moving the slider pointers 1554–1594 and the slider bars 1556–1596 upwards the represented image value or range of image values of the input image to be correspondingly increased when generating the outputting image. Thus, placing all of the slider pointers 1554–1594 and the corresponding slider bars 1556–1596 at the 100%, or middle location causes the output image values to be identical to the input image values.

Figure 13A:
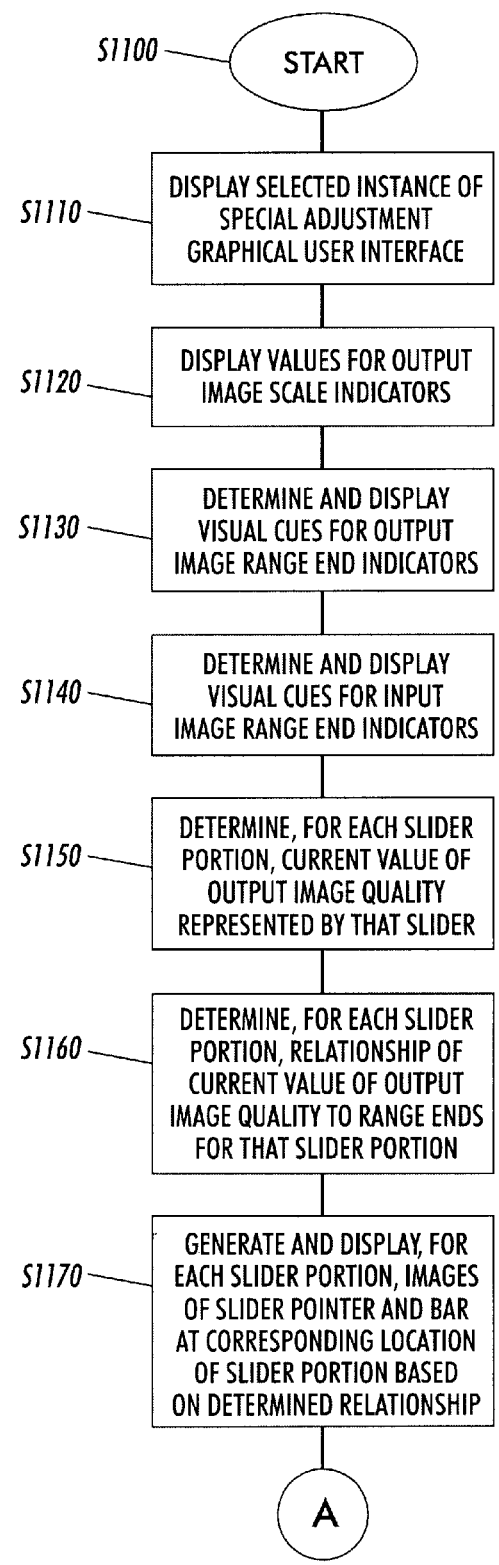
FIGS. 13A–13C are a flowchart outlining one exemplary embodiment of a method for generating, displaying and using the response curve control graphical user interface according to this invention.
Figure 13B:
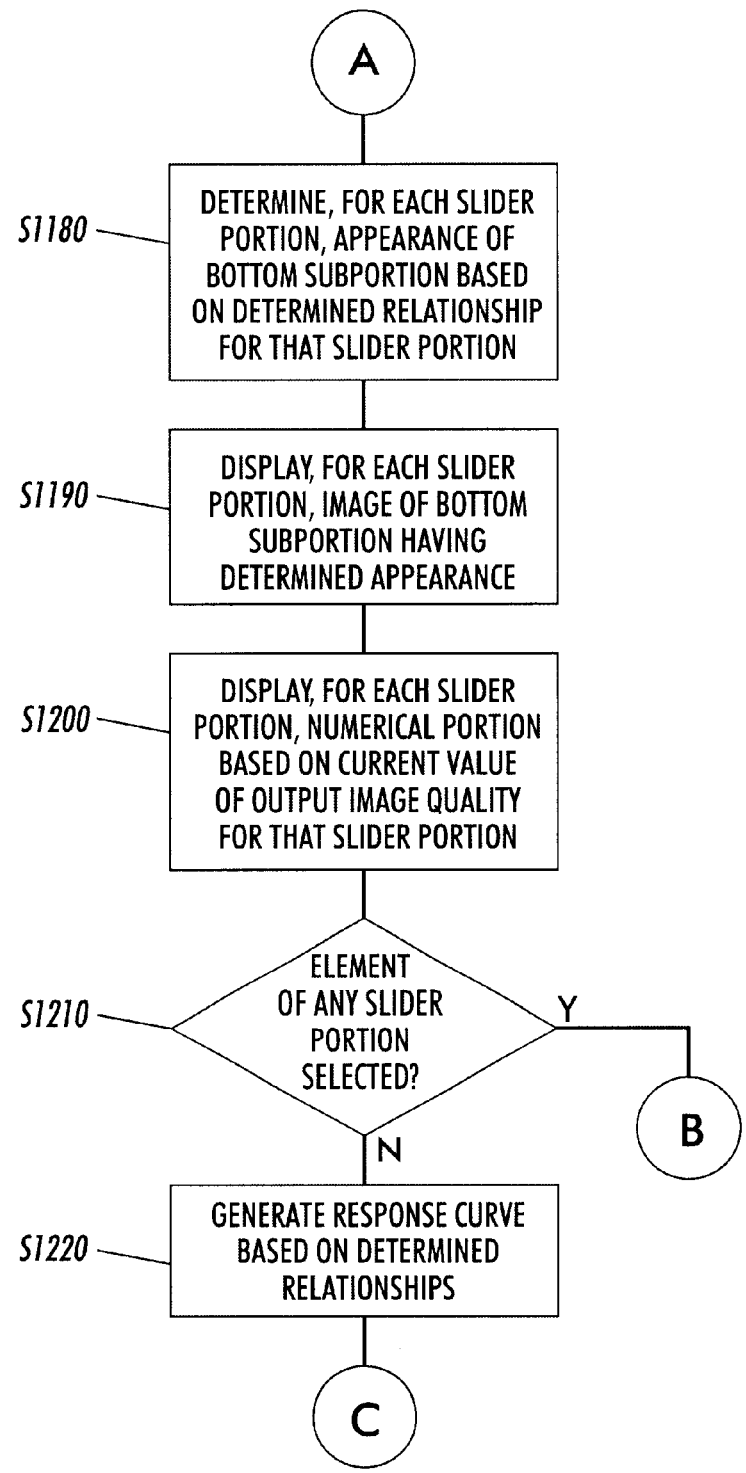
Figure 13C:
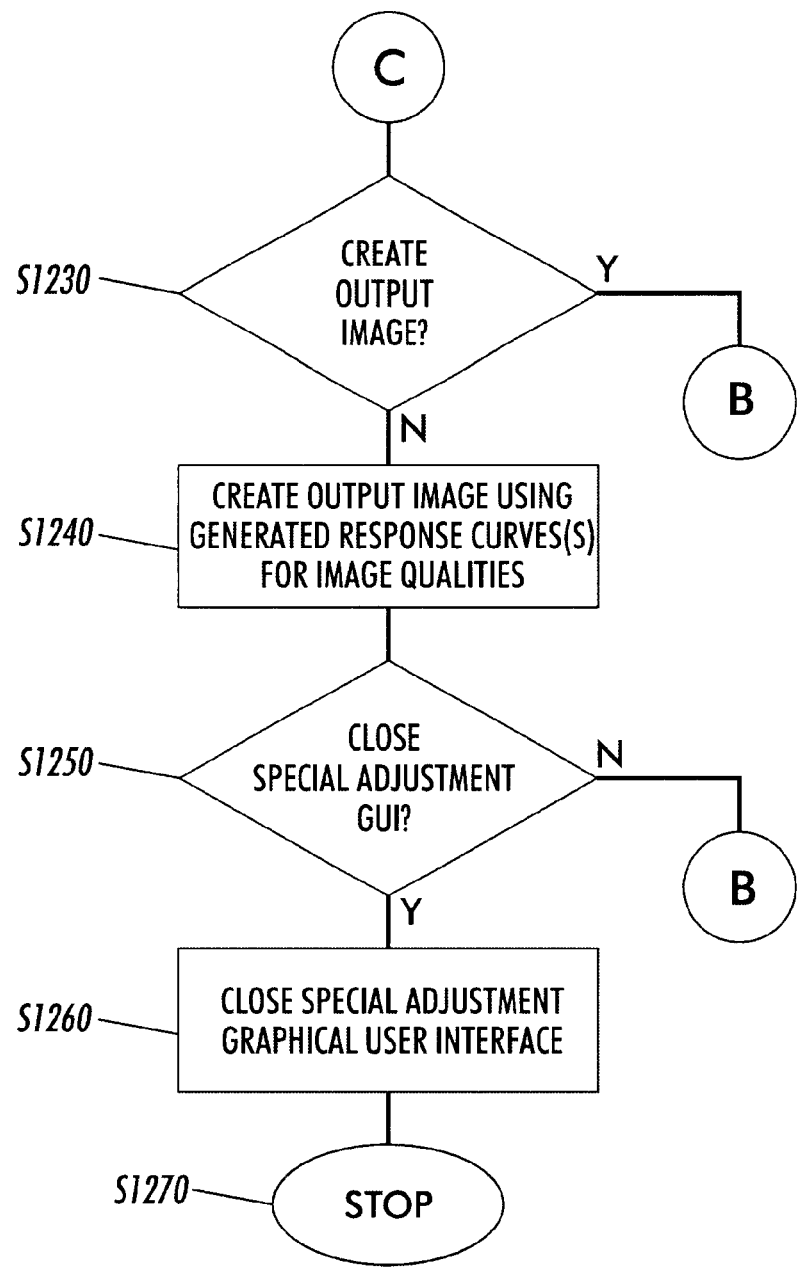

FIGS. 13A–13C are a flowchart outlining one exemplary embodiment or a method for displaying a special adjustment graphical user interface and using the displayed special adjustment graphical user interface to adjust the response curve for a selected image quality. Thus, beginning in step S1100, which occurs whenever the special adjustment graphical user interface is accessed, control continues to step S1110, where a selected instance of the special adjustment graphical user interface is displayed for the selected image quality. Next, in step S1120, the values for the scale indicators 1542 and 1544 are determined and displayed. Then, in step S1130, visual cues for the output image range end indicators are determined and displayed. Next, in step S1140, the visual cues for the input image range end indicators 1547 and 1548 are determined and displayed. Control then continues to step S1150.

In step S1150, for each of the implemented slider portions, a current value of the response curve for the input image quality value represented by each of the slider portions is determined. Next, in step S1160, the relationship of the current value for each slider relative to the ends of the scale is determined. Then, in step S1170, for each of the slider portions, images of the slider pointer and the slider bar are generated and displayed at the appropriate relative location within the slider portion based on the determined relationship. Control then continues to step S1180.

In step S1180, for each of the slider portions, the appearance of the bottom subportion of each slider is determined based on the determined relationship and an appearance map that defines the different appearances the bottom subportions can take. Then, in step S1190, images of each of the bottom subportions of the slider portions are generated and displayed based on the corresponding determined appearance. In step S1200, for each of the slider portions, an image of the corresponding numerical portions is generated and displayed based on the current value of the response curve. Control then continues to step S1210.

In step S1210, a determination is made whether the user has selected one of the slider portions, the slider bar, the slider portion, or either of the increase or decrease buttons of the numerical portion corresponding to that slider portion. If so, control jumps back to step S1150. Otherwise, control continues to step S1220.

In step S1220, a response curve is generated based on the current values of each of the slider portions. Next, in step S1230, a determination is made whether the user has selected that an output image is to be created. If so, control continues to step S1240. Otherwise, control jumps back to step S1150. As indicated above, the output image can either be a captured electronic image of a scanned original document, or an image formed on an image recording medium from stored electronic image data.

In step S1240, the output image is created using the response curve generated in step S1220. Next, in step S1250, a determination is made whether the special adjustment graphical user interface window has been closed. If so, control continues to step S1260. Otherwise, control jumps back to step S1150. In step S1260, the special adjustment graphical user interface is closed. Then, in step S1270, the response curve adjusting method ends.

In addition to providing the above task specific user instructions and tone reproduction curves, there is a need for other features to obtain desired scanning results including original document orientation. FIG. 6 shows one exemplary embodiment of the graphical user interface 400 including a document orientation portion 530.

In particular, the document orientation portion 530 includes a short edge first/long edge first (SEF/LEF) toggle button 532, a rotate button 534 and an input document mimic portion 2550. The SEF/LEF toggle button 532 allows the user to indicate whether the first edge of the original document to be introduced into the document handler 130 of the image capture device 100 is the long edge, such as the 11 inch edge of standard 8½×11 inch paper, or the short edge, i.e., 8±2 edge of standard 8½×11 inch paper. In particular, the user will be expected to feed the original document into the document handler 130 or place it on the platen 110 in the same orientation as specified in the graphic displayed on the SEF/LEF toggle button.

The rotate button 534 allows the user to specify the orientation of the image on the input document. That is, the user may be providing the original document to the document handler using the long edge first orientation while the image has been placed onto that original document in a landscape orientation. In this case, by activating the rotate button 534, the rotate button 534 indicates that the input image orientation is rotated 90° clockwise. This is discussed in greater detail below.

The input document mimic portion 2550 is a graphic that assists the operator in putting the document into the scanner correctly to receive the desired output. That is, the input document mimic portion 2550 can be used by the user to precisely identify to the image capture device the paper size and feed direction of the original document to be scanned, as well as the image orientation, so that the captured images will be returned to the calling application in the desired orientation.

A document orientation portion 551 and an image orientation portion 552 of the input document mimic portion 2550 indicate, in conjunction with the SEF/LEF toggle button 532 and the rotate button 534, the orientation the original document needs to be placed into on the image capture device in order to obtain an "upright" oriented captured image. An upright oriented captured image is an image that has the orientation of the graphic 482 shown in the preview pane portion 480 of the graphical user interface 400 shown in FIG. 6. Thus, for example, for a captured text image, the text of the captured image is upright if the bottom-most portions of the text characters are aligned with, and are closest to, the bottom edge 483 of the page mimic 482 of the preview pane portion 480 shown in FIG. 6.

The input document mimic portion 2550 has two modes which can be selected by the user. In a default, "program sides and orientation" mode, the user is able to select whether to feed the original documents into the image capture device using either the short edge first (SEF) orientation or the long edge first (LEF) orientation. The user is also able to select the orientation of the original image on the piece of paper using the rotate button 534. The user selects the long edge first or short edge first orientation using the SEF/LEF toggle button 532. In particular, pressing the SEF/LEF toggle button 532 first selects one of the long edge first or short edge orientations. Then, pressing the SEF/LEF button again switches to the other of the short edge first or long edge first orientations.

Figure 14:
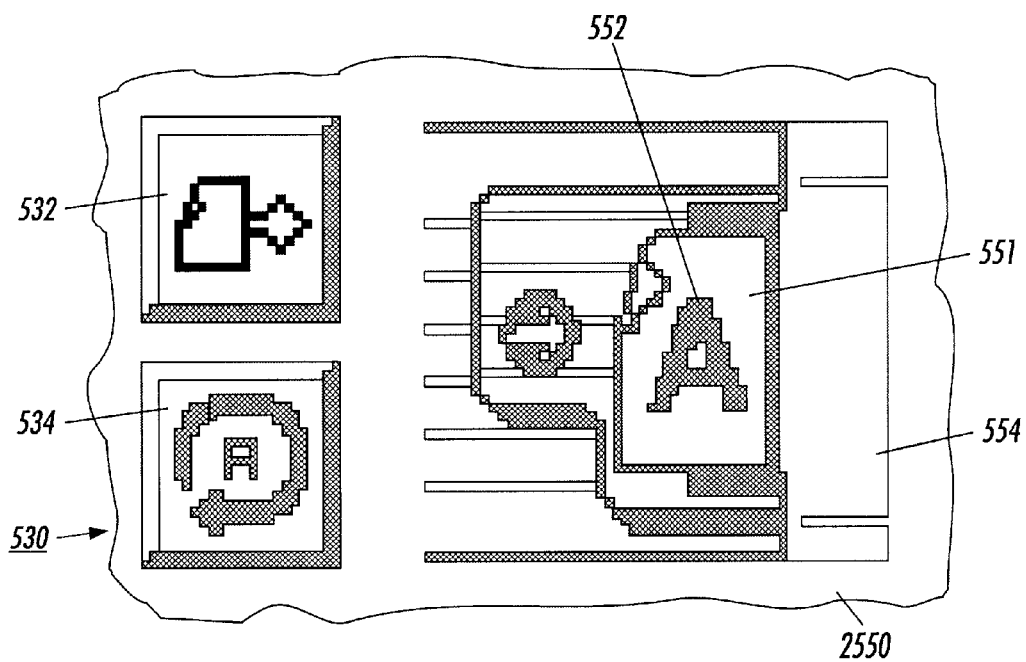
FIGS. 14–19 show in greater detail various exemplary embodiments of document orientation visual cues usable with the document orientation portion of the graphical user interface shown in FIG. 6.
Figure 15:
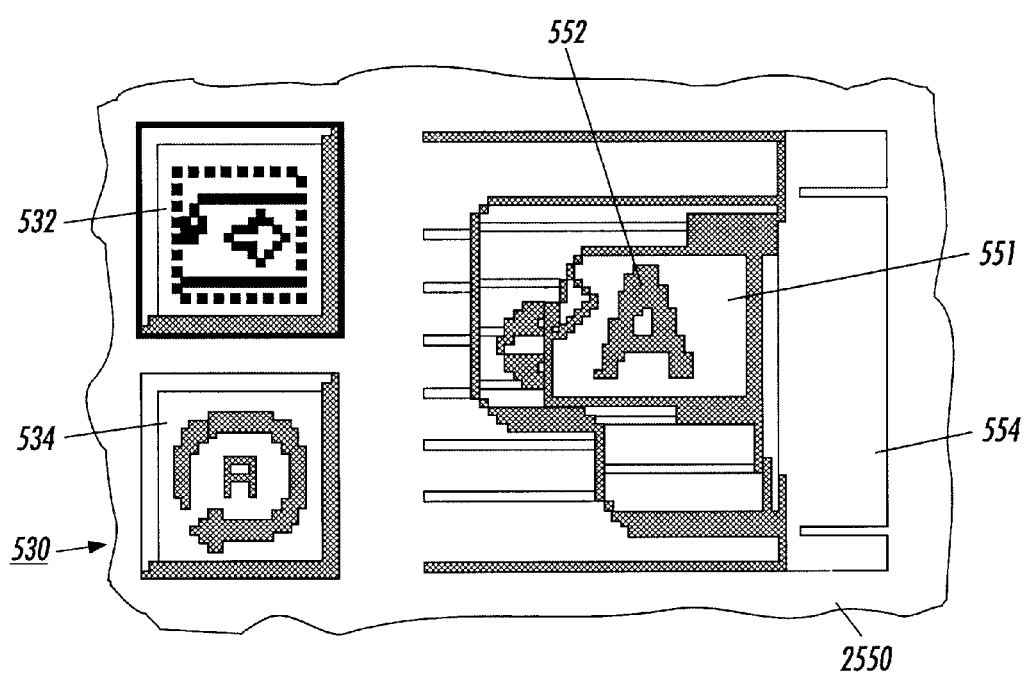

FIG. 14 shows the SEF/LEF toggle button 532 and the document orientation portion 551 and the image orientation portion 552, with the current state of the SEF/LEF button 532 and the document orientation portion 551 indicating the original document should be in the long edge first orientation. FIG. 15 shows the results of a user selecting the SEF/LEF toggle button 532, to charge the current orientation for feeding the original document into the image capture device from the long edge first orientation to the short edge first orientation. This is shown graphically by the SEF/LEF button 534, a document handler graphic 554, and the document orientation portion 551 in FIG. 15. It should be appreciated that, when the SEF/LEF button 532 is pressed, the graphics displayed for the SEF/LEF button 532 and the document orientation portion 551 change to provide visuals cues to the user of the currently selected orientation of the original document that will result in an upright captured image.

Figure 16:
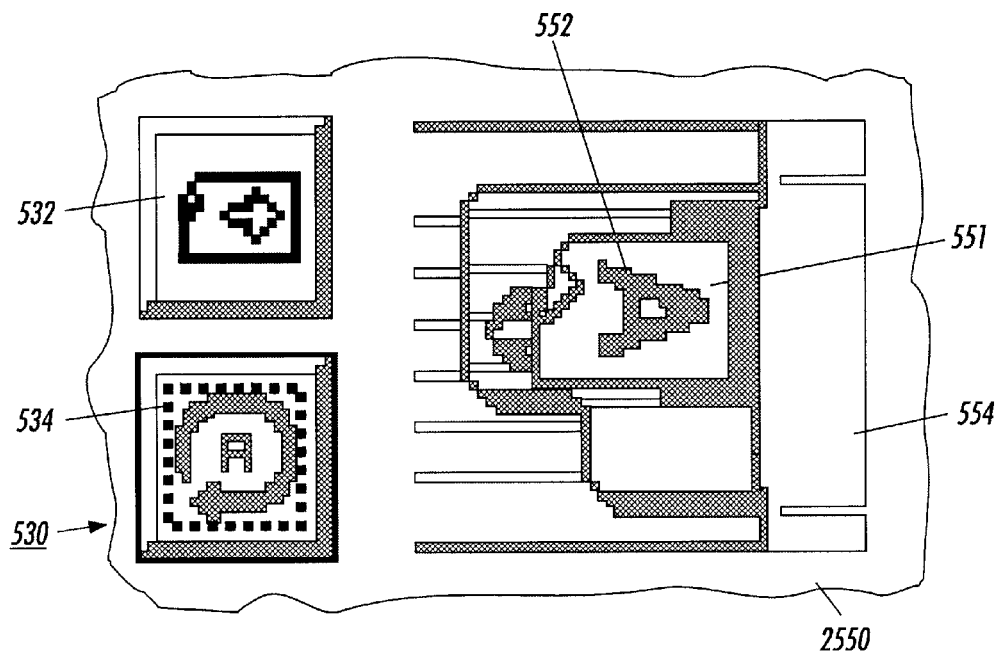

Using the rotate button 534, the user indicates which way the image is oriented on the original document. FIG. 15 shows the input originals with the image oriented so that the top of the image is aligned with a long edge of the original document. This is commonly referred to as the "landscape" orientation. As shown in FIGS. 15 and 16, when the user selects the rotate button 534, the image orientation portion 552 of the input document mimic portion 2550 rotates 90° to indicate that the originals are being fed into the scanner with the top of the image oriented toward a short edge of the original document. This is commonly referred to as the "portrait" orientation. It should be appreciated that the rotate button 534 can be pressed repeatedly to rotate the image orientation portion 552 in 90° increments to allow the user to feed originals whose images have their top toward either short edge, or toward either long edge, of the input image.

After the user indicates how the original document will be fed into the document handler, either short edge first or long edge first, and indicates how the image is oriented on the original document, the user then proceeds to insert the original into the feeder as indicated and the image capture device captures an image of the original document. As a result, if the original image is fed into the image capture device as indicated by the document orientation portion 551 of the input document mimic portion 2550, with the image oriented as indicated by the image orientation portion 552 of the input document mimic portion 2550, the captured image will be returned to the user in an upright orientation.

Figure 17:
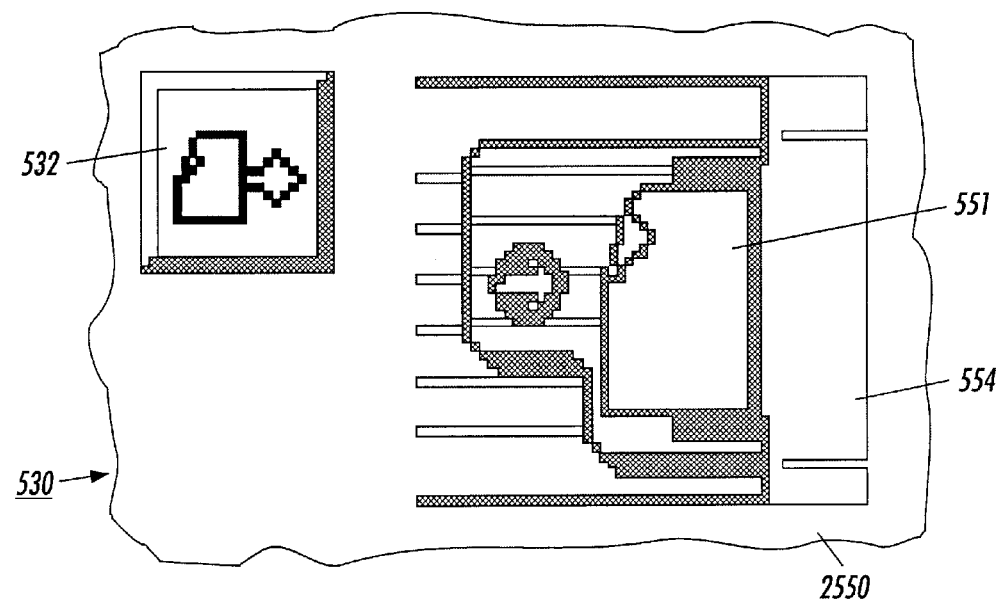

The second mode for the input document mimic portion is a "program sides only mode". FIG. 17 illustrates one exemplary embodiment of the document orientation portion 530' for the program sides only mode. As shown in FIG. 10, the document orientation portion 530' omits the rotate button 534 that appears next to the input document mimic portion 2550 of the document orientation portion 530 shown in FIGS. 14–16. Additionally, the input document mimic portion 550 of the document orientation portion 530' also omits the image orientation portion 551 of the input document mimic portion 5250 shown in FIGS. 14–16. In this program sides only mode, the user only chooses whether the original document will be fed short edge first or long edge first, using the SEF/LEF toggle button 532. The image of the original document will be captured with no concern for the orientation of the image on the original document. The captured image may therefore appear upside down, or rotated 90° when displayed in the preview pane portion 480. This reflects a more "copier-like" behavior, where an image put into a copier upside-down will come out upside-down.

Thus, as indicated above and as shown in FIGS. 14–16, in the program sides and orientation mode, the input document graphics, comprising an image orientation portion 551 and a document orientation portion 552, of the input document mimic portion 2 550 will be altered so that the input document graphics indicate to the user the selected orientations of both the long or short edges of the input document and the image on the original document relative to the selected long edge first or short edge first orientation of the original document.

In the program sides only mode, the input document graphics comprising only the document orientation portion 551 of the input document mimic portion 2550, will be altered so that the input document graphics indicate to the user the selected orientation of the long and short edges of the input document.

It should be appreciated that, in FIGS. 6 and 14–17, the input document mimic portion 2550 indicates that the user has selected to use an automatic document handler of the image capture device, such as the document feeder 130 of the scanner 100 shown in FIG. 1. However, the user may not wish to use the automatic document handler, but rather may wish to place the original document by hand onto the platen of the image capture device, such as the platen 120 of the image capture device 100 shown in FIG. 1. In this case, selecting the input document mimic portion 2550 changes the displayed input document graphics from those for the document handler graphic 554 shown in FIGS. 14–16 to those for the hand placement graphic 556 shown in FIG. 18. Again, the displayed input document graphics of the input document mimic portion 550 indicate the correct orientation of the original document on the platen that will result in an upright captured image. As indicated above, selecting the desired mode and, depending on the selected mode, selecting the desired states for the SEF/LEF toggle button 532 and the rotate button 534, will change the orientation of the original document in the hand placement graphic 556 shown in FIG. 18.

Figure 18:
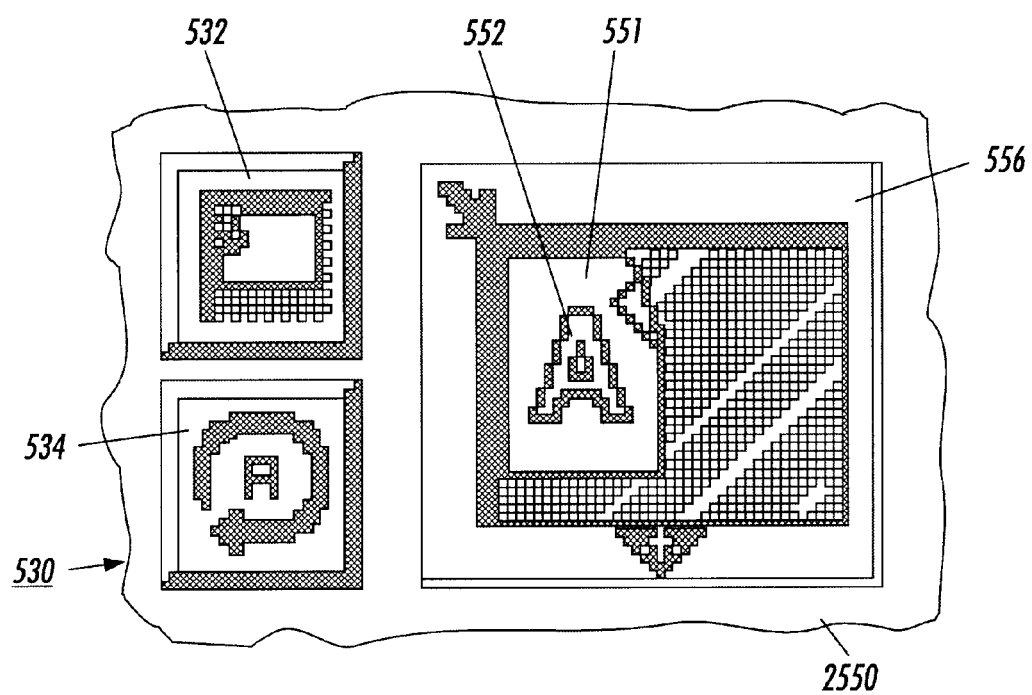
Figure 19:
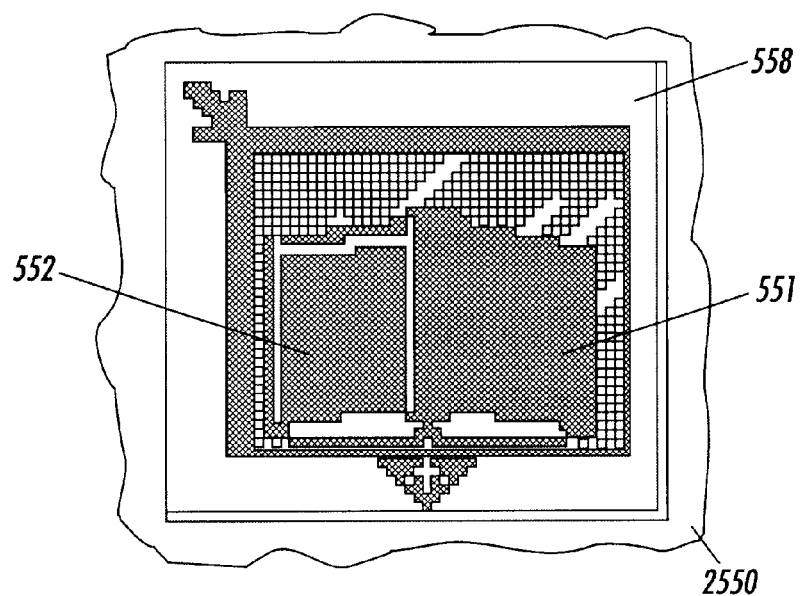

If the user wishes to capture an image from a bound original document instead of capturing a captured image from a single sheet original document, the user can again select the input document mimic portion 550 to again change the displayed input document graphics from the hand placement graphic 556 shown in FIG. 18 to a bound document graphic 558, as shown in FIG. 19. As in the automatic document handler graphic 554 and the hand placement graphic 556, the bound document graphic 558 visually indicates to the user how the bound document is to be placed onto the platen of the image capture device in order to obtain an upright captured image. It should be appreciated that, in various exemplary embodiments, depending on the selected mode, the states of the SEF/LEF toggle button 532 and the rotate button 534, the orientation of the bound document orientation portion 551 and/or the image orientation portion 552, in the bound document graphic 550 will change so that a visual indication is provided to the user of the orientation of the bound document and the image of the bound document being captured.

Figure 20A:
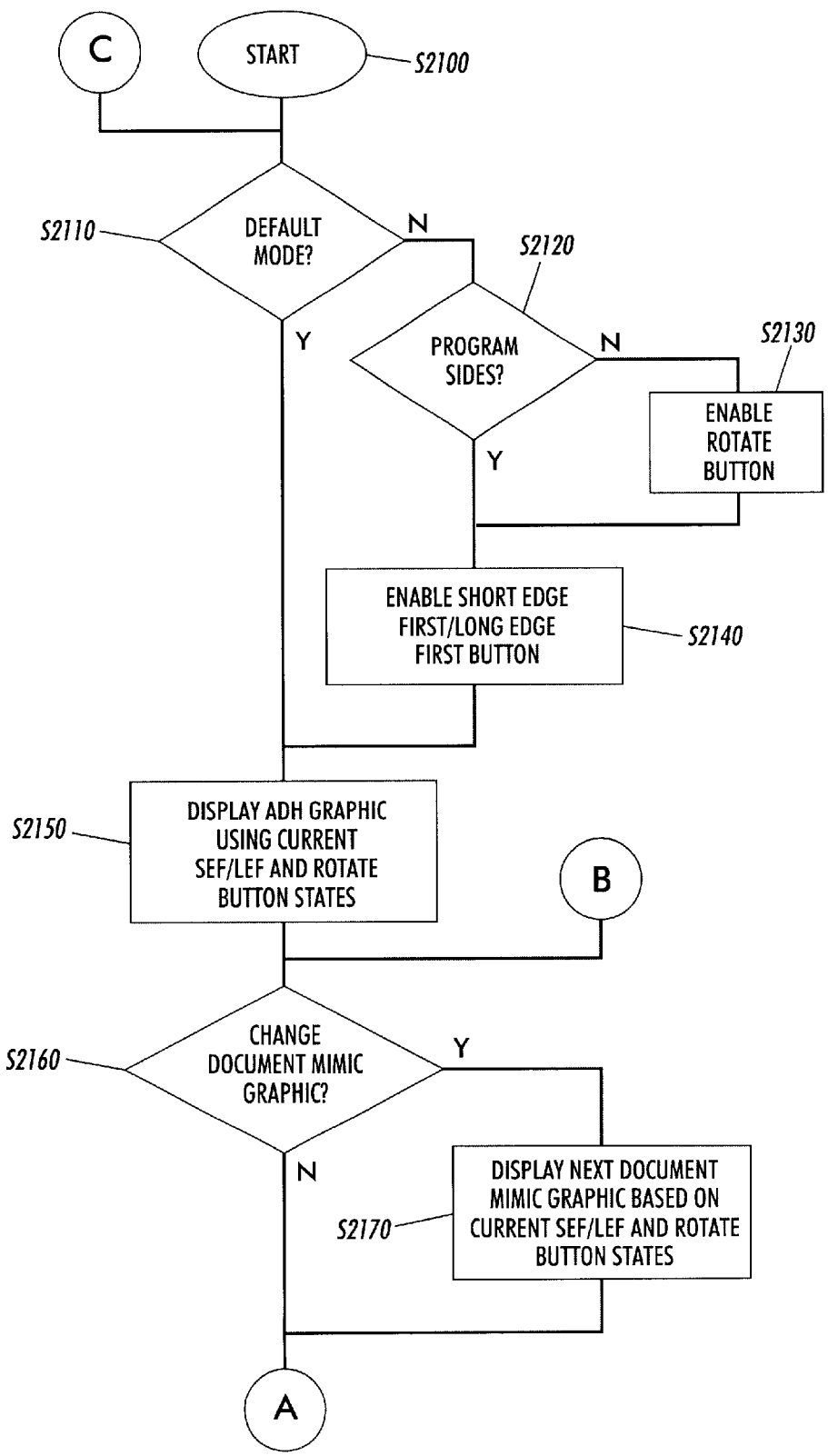
FIGS. 20A and 20B are a flowchart outlining one exemplary embodiment of a method for generating, displaying and using the document orientation portion and visual cues according to this invention.
Figure 20B:
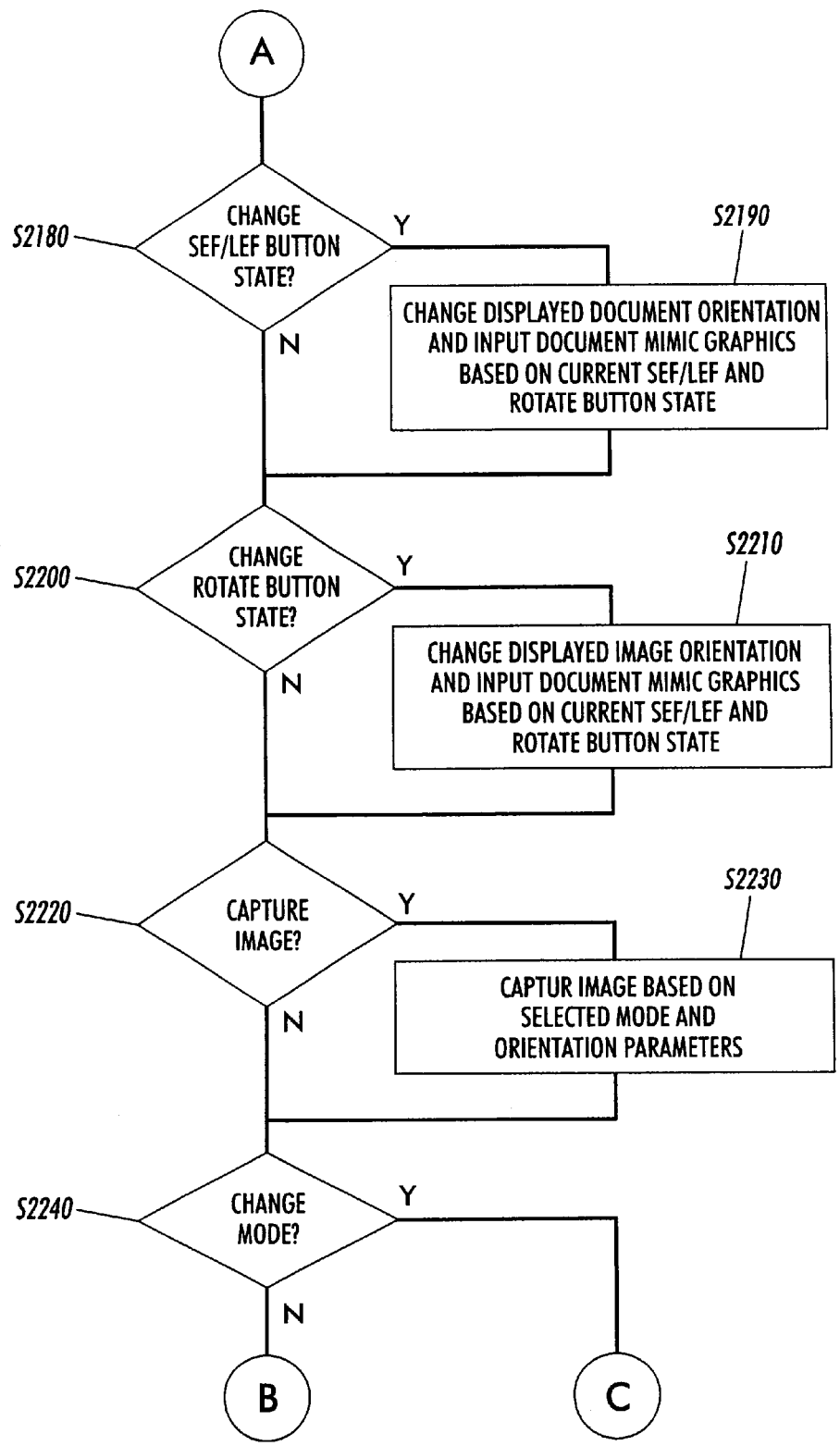

FIGS. 20A and 20B are a flowchart outlining one exemplary embodiment of a method for selecting the image orientation parameters and for using the selected image orientation parameters to capture an image from an original document according to this invention.

Control begins in step S2100, upon displaying the graphical user interface that contains the image orientation widgets according to this invention. Next, in step 110, a determination is made whether the default mode has been selected. If so, control jumps directly to step S2150. Otherwise, control continues to step S2120.

In step S2120, a determination is made whether the "program sides" mode has been selected. If not, then the "program sides and image orientation" mode has been selected, and control thus continues to step S2130. Otherwise, control jumps directly to step S2140.

In step S2130, the rotate button is enabled. Then, in step S2140, the SEF/LEF button is enabled. Next, in step S2150, the automatic document feeder graphic is displayed using the current states of the SEF/LEF button and the rotate button. In particular, if the default mode is selected, the states of the SEF/LEF and rotate buttons are the default states for the particular image capture device that has been selected and cannot be changed. In contrast, in the other modes, the actual states of the SEF/LEF button and/or the rotate button are used to determine visual cues in the particular document orientation portions and the image orientation portions of the automatic document handler graphic. Control then continues to step S2160.

In step S2160, a determination is made whether the user wishes to change the input document graphic of the input document mimic. If so, control continues to step S2170. Otherwise, control jumps directly to step S2180. In step S2170, the next input document graphic is displayed in the input document mimic portion using the current states for the SEF/LEF and rotate buttons. In particular, in the exemplary embodiments discussed above, if the current input document mimic is the document handler graphic, the next input document graphic is the hand placement graphic, then the bound document graphic and then back to the document feeder graphic. It should be appreciated that, if the particular image capture device selected by the user has more or fewer available operational modes, such as lacking an automatic document feeder or having both a recirculating document feeder and a bypass document feeder, different series of displayed input document mimic graphics can be displayed. Similarly, different orders of the input document graphic can be used. Control then continues to step S2180.

In step S2180, a determination is made whether the user has changed the state of the SEF/LEF button. If so, control continues to step S2190. Otherwise, control jumps directly to step S2200. In step S2190, the currently displayed input document graphic is updated to change the graphics displayed in the document orientation portion and the image orientation portion of the input document graphic, based on the newly selected state of the SEF/LEF button. Control then continues to step S2200.

In step S2200, a determination is made whether the rotate state has changed. If so, control continues to step S2210. Otherwise, control jumps to step S2220. In step S2210, the currently displayed input document graphic is updated to change the graphics displayed in the document orientation and image orientation portions of the current input document graphic, based on the new rotate state. Control then continues to step S2220.

In step S2220, a determination is made whether the user has input or command to scan the next input document using the currently selected short or long edge first and rotation parameters, as indicated by input document mimic portion of the graphic user interface. If so, control continues to step S2230, where an image is captured of the next input document based on these selected image capture parameters, among others. Control then continues to step S2240.

In step S2240, a determination is made whether the user has selected to change the currently selected document orientation mode. If so, control jumps to step S2110. Otherwise, control jumps back to step S2160.

As shown in FIGS. 20A and 20B, the method outlined in FIGS. 20A and 20B continues indefinitely so long as the graphical user interface containing the image orientation widgets discussed above is active.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 9A–9C, FIGS. 13A–13C and FIGS. 20A–20B can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIG. 2 or 5 can be implemented as physically distinct hardware circuits within a ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 can each also be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image capture control system for an image capture device, comprising:

a controller that provides control parameters to the image capture device, the image capture device able to capture an image from an original document based on the provided control parameters, the control parameters including scale parameters usable to scale the captured image;

a display device; and a graphical user interface displayable on the display device, the graphical user interface including a plurality of sliders associated with a control function, each slider allowing a user to control a corresponding portion of the associated control function and comprising:

a slider portion, a range of values for the corresponding portion of the associated control function associated with a vertical dimension of the slider portion;

a pair of numerical indicators, a first one of the pair of numerical indicators associated with a minimal value of the range of values and positioned relative to a bottom of the slider portion, a second one of the pair of numerical indicators associated with a maximal value of the range of values and positioned relative to a top of the slider portion;

a slider bar extending across the slider portion perpendicularly to the vertical dimension of the slider portion, the slider bar positioned along the vertical dimension of the slider portion based on a relationship between a default value for the corresponding portion of the associated control function and the range of values; and a selectable slider pointer positioned adjacent to the slider portion, the slider pointer positioned along the vertical dimension of the slider portion based on a current value for the corresponding portion of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion, wherein an appearance of the bottom subportion of the slider portion is determined based on the relationship between the current value for the corresponding portion of the associated control function and the range of values, is uniform within the bottom subportion of the slider portion, and contrasts visually with the top subportion of the slider portion; and wherein the graphical user interface includes a task-specific help function, wherein the graphical user interface further comprises a task list display portion that is displayable when the task-specific help function is invoked, the task list display portion containing at least one selectable task identifier associated with a portion of the graphical user interface against which the task-specific help function was invoked.

2. The image capture control system of claim 1, wherein the graphical user interface further comprises a task-specific instruction portion that is displayable when one of the at least one task identifier displayed in the task list display portion is selected.

3. The image capture control system of claim 2, wherein the task-specific instruction portion includes:
   user instructions associated with the selected task identifier; and
   at least one task identifier associated with the selected task identifier.

4. The image capture control system of claim 3, wherein the user instructions associated with the selected task identifier include a textual description of steps a user should perform to accomplish a task associated with the selected task identifier.

5. The image capture control system of claim 4, wherein the textual description comprises at least one selectable term, wherein, when the selectable term is selected, a help entry associated with the selectable term is displayed in a help graphical user interface window.

6. A graphical user interface displayable on a display device, the graphical user interface including a plurality of sliders associated with a control function, each slider allowing a user to control a corresponding portion of the associated control function and comprising:

a slider portion, a range of values for the corresponding portion of the associated control function associated with a vertical dimension of the slider portion;

a slider bar extending across the slider portion perpendicularly to the vertical dimension of the slider portion, the slider bar positioned along the vertical dimension of the slider portion based on a default value for the corresponding portion of the associated control function and the range of values; and a selectable slider pointer positioned adjacent to the slider portion, the slider pointer positioned along the vertical dimension of the slider portion based on a current value for the corresponding portion of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion, wherein an appearance of the bottom subportion of the slider portion is determined based on the current value for the corresponding portion of the associated control function and the range of values, is uniform within the bottom subportion of the slider portion, and contrasts visually with the top subportion of the slider portion; and wherein the graphical user interface includes a task-specific help function, wherein the graphical user interface further comprises a task list display portion that is displayable when the task-specific help function is invoked, the task list display portion containing at least one selectable task identifier associated with a portion of the graphical user interface against which the task-specific help function was invoked.

7. The graphical user interface of claim 6, wherein the graphical user interface further comprises a task-specific instruction portion that is displayable when one of the at least one task identifier displayed in the task list display portion is selected.

8. The graphical user interface of claim 7, wherein the task-specific instruction portion includes:
   user instructions associated with the selected task identifier; and
   at least one task identifier associated with the selected task identifier.

9. The graphical user interface of claim 8, wherein the user instructions associated with the selected task identifier include a textual description of steps a user should perform to accomplish a task associated with the selected task identifier.

10. The graphical user interface of claim 9, wherein the textual description comprises at least one selectable term, wherein, when the selectable term is selected, a help entry associated with the selectable term is displayed in a help graphical user interface window.

11. An image capture control system for an image capture device, comprising:
   a controller that provides control parameters to the image capture device, the image capture device having at least one orientation control object and able to capture an image from an original document based on the provided control parameters, the control parameters including orientation control parameters being indicated by the at least one orientation control object and indicating at least one of an orientation of the original document and an orientation of an image on the original document that will result in an upright captured image, wherein the control parameters are selected before capturing the image;

a display device, an input document mimic displayable on the display device, the input document mimic indicating a current state of at least one of the orientation control parameters while the image is being captured, wherein the input document mimic displays a graphic having an orientation and corresponding to the image being captured, wherein the orientation of the graphic changes based on a selection of the control parameters before capturing the image to provide visual guidance for placing the original document; and a graphical user interface displayable on the display device, the graphical user interface including a task-specific help function, wherein the graphical user interface further comprises a task list display portion that is displayable when the task-specific help function is invoked, the task list display portion containing at least one selectable task identifier associated with a portion of the graphical user interface against which the task-specific help function was invoked.

12. The image capture control system of claim 11, wherein the graphical user interface further comprises a task-specific instruction portion that is displayable when one of the at least one task identifier displayed in the task list display portion is selected.

13. The image capture control system of claim 12, wherein the task-specific instruction portion includes:

user instructions associated with the selected task identifier; and at least one task identifier associated with the selected task identifier.

14. The image capture control system of claim 13, wherein the user instructions associated with the selected task identifier include a textual description of steps a user should perform to accomplish a task associated with the selected task identifier.

15. The image capture control system of claim 14, wherein the textual description comprises at least one selectable term, wherein, when the selectable term is selected, a help entry associated with the selectable term is displayed in a help graphical user interface window.

16. A graphical user interface displayable on a display device of an image capture control system for an image capture device, the image capture device having at least one orientation control object and able to capture an image from an original document based on control parameters, the control parameters including orientation control parameters being indicated by the at least one orientation control object and being selected before capturing the image, the graphical user interface comprising:

an input document mimic that indicates, while the image is being captured, a current state of at least one of an orientation of the original document and an orientation of an image on the original document that will result in an upright captured image, wherein the input document mimic displays a graphic having an orientation and corresponding to the image being captured, wherein the orientation of the graphic changes based on a selection of the control parameters before capturing the image to provide visual guidance for placing the original document, and wherein the graphical user interface includes a task-specific help function, wherein the graphical user interface further comprises a task list display portion that is displayable when the task-specific help function is invoked, the task list display portion containing at least one selectable task identifier associated with a portion of the graphical user interface against which the task-specific help function was invoked.

17. The graphical user interface of claim 16, wherein the graphical user interface further comprises a task-specific instruction portion that is displayable when one of the at least one task identifier displayed in the task list display portion is selected.

18. The graphical user interface of claim 17, wherein the task-specific instruction portion includes:

user instructions associated with the selected task identifier; and at least one task identifier associated with the selected task identifier.

19. The graphical user interface of claim 18, wherein the user instructions associated with the selected task identifier include a textual description of steps a user should perform to accomplish a task associated with the selected task identifier.

20. The graphical user interface of claim 19, wherein the textual description comprises at least one selectable term, wherein, when the selectable term is selected, a help entry associated with the selectable term is displayed in a help graphical user interface window.

* * * * *